United States Patent [19]
Meier et al.

[11] Patent Number: 6,058,393
[45] Date of Patent: May 2, 2000

[54] DYNAMIC CONNECTION TO A REMOTE TOOL IN A DISTRIBUTED PROCESSING SYSTEM ENVIRONMENT USED FOR DEBUGGING

[75] Inventors: Michael Stephen Meier, Newark; Hsin Pan, San Jose, both of Calif.

[73] Assignee: International Business Machines Corporation, Armonk, N.Y.

[21] Appl. No.: 08/606,166

[22] Filed: Feb. 23, 1996

[51] Int. Cl.⁷ ...................................................... G06F 17/30
[52] U.S. Cl. ............................ 707/10; 709/100; 714/38; 714/45; 395/704
[58] Field of Search ............................... 395/704, 183.14, 395/672, 709; 714/38, 45; 707/10; 709/100

[56] References Cited

U.S. PATENT DOCUMENTS

| | | | |
|---|---|---|---|
| 5,127,013 | 6/1992 | Hill et al. .................................. | 714/748 |
| 5,179,702 | 1/1993 | Spix et al. ................................ | 395/672 |
| 5,319,645 | 6/1994 | Bassi et al. ............................... | 714/38 |
| 5,361,352 | 11/1994 | Iwasawa et al. .......................... | 395/704 |
| 5,371,746 | 12/1994 | Yamashita et al. ....................... | 714/38 |
| 5,404,523 | 4/1995 | DellaFera et al. ........................ | 709/101 |
| 5,410,648 | 4/1995 | Pazel ........................................ | 395/704 |
| 5,493,675 | 2/1996 | Faiman, Jr. et al. ..................... | 395/709 |
| 5,771,385 | 6/1998 | Harper ...................................... | 395/704 |
| 5,781,778 | 7/1998 | Meier et al. .............................. | 395/704 |
| 5,787,245 | 7/1998 | You et al. ............................ | 395/183.14 |
| 5,794,046 | 8/1998 | Meier et al. .............................. | 395/704 |
| 5,794,047 | 8/1998 | Meier ....................................... | 395/704 |
| 5,802,371 | 9/1998 | Meier ....................................... | 395/704 |
| 5,815,653 | 9/1998 | You et al. ............................ | 395/183.14 |
| 5,901,315 | 5/1999 | Edwards et al. ......................... | 395/704 |

OTHER PUBLICATIONS

Ponamgi, M.K. et al., "Debugging Multithreaded Programs with MPD," IEEE Software, vol. 8, No. 3, May 1991, pp. 37–43.

Timmerman, M. et al., "The Design of D.A.R.T.S.: A Dynamic Debugger for Multiprocessor Real–Time Applications," IEEE Transactions on Nuclear Science, vol. 39, No. 2, Apr. 1992, pp. 121–129.

Borchert, C.B., "Organization and Management of Distributed Execution Event Histories for Real–Time Debugging," Southeastcon, 1992 IEEE Conference Proceedings, 1992, pp. 343–345.

(List continued on next page.)

*Primary Examiner*—Thomas G. Black
*Assistant Examiner*—Charles L. Rones
*Attorney, Agent, or Firm*—Gates & Cooper

[57] ABSTRACT

The present invention provides a dynamic connection for distributed applications that need to locate application development tools, including but not limited to debuggers, trace collection tools, compilers, etc.) which may be running on different machines, and to send the tools messages. The program requesting debugging service (i.e., a debugger client) sends, to a tool locator, criteria which specifies the properties of a desired debugger. The tool locator maintains a registry of all tools, e.g. debuggers, and their properties, which remain active within the network by receiving tool registration information from each tool as it is started on any machine within the network. When a message is received by the tool locator from a debugger client specifying the criteria of a desired debugger, the tool locator searches its registry and returns a list of debuggers matching the specified properties along with a communication endpoint address that can be used to establish a connection with a debugger meeting the criteria. The debugger client then sends a message, using the established connection, to the desired debugger requesting debugging services on behalf of the debugger client or another program. As a result, a dynamic connection is made, at run time, between an application program and a debugger having certain desired properties wherein the debugger may be active, if at all, at any time on any machine within the network.

30 Claims, 9 Drawing Sheets

OTHER PUBLICATIONS

Tsai, J.J.P. et al., "A Noninvasive Architecture to Monitor Real–Time Distributed Systems," Computer Magazine, vol. 23, No. 3, Mar. 1990, pp. 11–23.

Manabe, Y. et al., "Debugging Dynamic Distributed Programs Using Global Predicates," Parallel and Distributed Processing, 1992 Symposium (4th), 1992, pp. 402–407.

Tsai, J.J.P. et al., "On Real–Time Software Testing and Debugging," Computer Software and Applications Conference, 1990 COMPSAC, 1990 (7 pages).

Shimomura, T. et al., "Chase: A Bug–Locating Assistant System," Computer Software and Applications Conference—1991 COMPSAC, 1991, pp. 412–417.

Moher, T.G., "Provide: A Process Visualization and Debugging Environment," IEEE Transactions on Software Engineering, vol. 14, No. 6, Jun. 1988, pp. 849–857.

Arvind, D.K. et al., "Debugging Concurrent Programs Using Static Analysis and Run–Time Hardware Monitoring," Parallel and Distributed Processing, 1991 Proceedings, 1991, pp. 716–719.

DYNAMIC CONNECTION TO A REMOTE TOOL IN A DISTRIBUTED PROCESSING SYSTEM ENVIRONMENT USED FOR DEBUGGING

CROSS REFERENCE TO OTHER APPLICATIONS

This application is related by common inventorship and subject matter to copending Patent Application Serial No. 08/606,172 (pending) entitled "SYSTEM, METHOD AND PROGRAM FOR DEBUGGING EXTERNAL PROGRAMS IN CLIENT/SERVER-BASED RELATIONAL DATABASE MANAGEMENT SYSTEMS" filed on Feb. 23, 1996, assigned to the Assignee hereof, and entirely incorporated herein by this reference.

This application is related by common inventorship and subject matter to copending patent application Ser. No. 08/314,838 entitled "METHOD AND SYSTEM FOR DEBUGGING PARALLEL AND DISTRIBUTED APPLICATIONS" filed on Sep. 29, 1994, now U.S. Pat. No 5,802,371, issued on Sep. 1, 1998, assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to systems, methods, and programs for utilizing application development tools in a client/server and/or distributed processing system environment, and more generally, in a network of processing systems, and more specifically, for utilizing a debugger to debug parts of application programs that may run on different machines in such an environment.

2. Description of the Related Art

A distributed processing environment includes two or more processing nodes connected by a communications link, i.e., a network. At each processing node, there may be at least one processor, and any assortment of memory devices, storage devices, and input/output devices such as keyboards, displays, etc. The advantages of a distributed processing system include being able to utilize the resources (e.g., files, applications, tools, storage, etc.) resident at another node in the network. However, technical difficulties arise in trying to utilize and take advantage of these resources in a distributed environment. More specifically, technical difficulties arise when parts of an application program execute on different machines, especially when one desires to debug such an application program. Difficulties also arise when a debugger may reside on a different machine than the program to be debugged or may reside anywhere within a network of machines.

When developing a user's program that may be running in a distributed environment and is embedded within a larger application not written by the user, it is often difficult to debug the user's program. For example, for a CICS™ transaction, a DB/2™ stored procedure, trigger, user-defined functions, and code utilizing object-oriented frameworks, the developer of the larger program, in many cases, will only provide an application program interface (API) and a specification of its behavior. Source code for the larger program or information on its implementation is often not provided to allow its developer greater flexibility in making changes such as enhancements and bug fixes. In addition, for distributed client/server applications such as a CICS™ transaction, DB2™ stored procedure, or DSOM server, the application programs are executed under the control of a software system such as the CICS™ transactions manager, DB2™ database management system, or DSOM runtime environment. As such, the software system and various parts of an application program may be executing on different machines. This makes it difficult to run the application program under a debugger because it is not easy to determine when the application program will be invoked by the software system and, in some cases, what process and/or machine it will run in. In addition, it is difficult, if not impossible, for a debugger to penetrate all the layers of code in the large software systems in order to find the smaller programs (e.g., stored procedures, user-defined functions, CICS™ transaction) to debug.

CICS™ (Customer Information Control System) is a transaction monitoring system which provides a high level of efficiency for executing, including executing concurrently, thousands of multiple short running application programs, i.e., transaction programs. For example, many financial transactions, e.g., debiting accounts, crediting accounts, transfers, etc., may run under a transaction monitor. Transaction monitors that run on workstation platforms such as the UNIX™ operating system and OS/2™ operating system have similarities in their architecture. Such transaction monitors include CICS™/6000, TUXEDO,™ and ENCINA™, to name a few.

The technology of running external programs on the server side of a Relational Database Management System (RDBMS) has been developed in the past few years. For example, DB2™/Common-Server for AIX™/6000 (DB2™/CS) supports external programs. External programs are written by the application developer in a host 3GL language such as C and C++. They could be invoked by the RDBMS in one of two forms: (1) as a subprogram running inside of the server's "address space" (also referred to as "process"), or (2) as a stand-alone application running on the server machine. The former is usually referred to as User-Defined Functions (UDF), and the latter is referred to as Stored Procedures.

A stored procedure allows the application developer to break a database application program into a client part and a server part. A stored procedure is a precompiled program that is stored at the server site and invoked from the client. The server part can issue SQL language request while running on the same machine as the RDBMS server such as a DB2™/CS server. Results from the execution of the stored procedure can be passed back to the client part which is usually running on a different machine. In many applications, this can greatly improve the performance of the database application. Stored procedures reduce the network traffic between the client and the server. Other advantages include concealing a variety of system-specific and/or database-specific details from the user, thereby providing a greater degree of data independence; sharing a stored procedure by many clients; and providing enhanced security by authorizing a given user to invoke a given procedure but not to operate directly on the data accessed by that procedure.

In addition, the following described invention is also applicable to triggers. A trigger allows a user to associate certain SQL operations with a certain event. A trigger is a procedure that is to be invoked, by the database management system, when a specific condition occurs. For example, a trigger could be invoked to check the range value of employees' salaries whenever an SQL update is made to an employee/salary table to ensure that no salary goes above a certain amount. More specifically, an external trigger is a trigger than runs externally from the system software, i.e., a DBMS.

UDF (User-Defined Function) is, as its name implies, a function that takes in input and returns single value results. As a function, it must be embedded in an SQL expression. UDF is an innovative feature introduced in release 2 of the IBM DB2™/6000 relational database system. In addition, the new SQL3 standard provides a definition for user-defined functions. A user-defined function extends the functionality of the underlying DBMS (Data Base Management System) such as DB2™/CS by allowing users to define their own SQL functions implemented in a 3GL host language such as C and C++. Once created in the DBMS, UDFs can be invoked from any context where a SQL expression is expected or invoked from within any SQL expression as if they were built-in functions.

In a practical implementation, UDF could be run under two kinds of environment. For better security, a "firewall" is created between the database engine run-time and the UDF run-time. This is normally achieved by running UDF code in a separate process which is different from the engine process. Such a UDF is called a fenced UDF. In contrast, for better performance, UDF code is run in the same process as that of the database engine. Such a UDF is called an un-fenced UDF.

There are two components associated with a UDF: the specification component and the realization component. The former is specified by the create function SQL statement and maintained by the DBMS. The latter is specified by code written in a host language, prepared using the host language compiler and linkage editor, and maintained by the operating system. Different UDFs can share the same implementation. In other words, one realization component can be associated with more than one specification component. One situation where this can occur is when two UDFs have the same functionality but different runtime environments: one runs in a fenced mode, and the other runs in an unfenced mode.

Currently, there is no practical method for debugging external programs. The current practice is to write a test driver program which simulates the DB2™/CS call to the external program.

The main problem with debugging external programs is that the external programs are executed under the control of the database engine which is itself a large software system for which no source code is provided. It is therefore impractical for a debugger to penetrate through the layers of software of the database engine to locate and debug the external programs. It is also very difficult for the debugger to determine when an external program will be invoked by the database engine and which process it will be run in. External programs are not statically linked with any executable module. Instead, they are dynamically loaded by the database engine at run-time when the associated UDF or stored procedure is about to be invoked which further complicates the situation for the debugger. In addition, in an environment where the DBMS is shared between a large number of users, it is necessary to ensure that the debugger does not violate the security of the DBMS or the underlying operating system.

Debugging multi-threaded applications in a distributed environment is known. One approach is to attach a debugger to the main software system and attempt to penetrate all of the software layers to get to the desired part of the program to be debugged. Another approach will stop execution in all of the threads and processes in order to debug an application running in one of the threads. Stopping the execution of processes in a single user environment may be acceptable, but such an approach is unacceptable in multi-user environments or where hundreds of processes may be running as in a CICS™ transaction monitoring system.

The Parallel and Distributed Dynamic Analyzer (PDDA) is a parallel and distributed debugger that can debug parallel and distributed applications including distributed middleware (e.g., CICS™/6000, DCE and DSOM) and DB2™/6000 application programs that use RPC and threads.

It is also known to have "application program initiating" debugging wherein an application program, itself, requests the services of a serial debugger when the debugger and application are running on the same machine.

However, it is not known to have an application program, itself, initiate debugging in a distributed environment where the debugger may be running on a different machine, or on several machines, different from the machine the application program is running on. Furthermore, it is not known to have "program-initiating" debugging for RDBMs external programs or transaction programs in a distributed environment. In a distributed environment, a problem arises in not being able to locate the machine or process within the machine that a desired debugger is running on. This difficulty is similar for locating any application development tool desired by an application running in a distributed processing environment.

SUMMARY OF THE INVENTION

It is an object of this invention to provide a mechanism for locating tools in a distributed environment and to have the capability to send the tools messages.

It is a further object of this invention to have an application program initiated debugging mechanism in which an application program requests debugging services from a remote debugger in a distributed environment.

It is a further object of this invention to have an application program initiated debugging mechanism in which a software system requests debugging services from a remote debugger on behalf of an application program in a distributed environment.

It is a further object of this invention to dynamically connect, at run time, an application program requesting debugging services from a debugger meeting a specified criteria of properties wherein the debugger may be active, if at all, on any machine within a network of processing systems.

This invention allows an user program to locate tools in a distributed environment and to send the tools messages. It provides a mechanism that allows users to add a statement to their program to invoke a tool library routine to request services from a tool that may be running on a different machine in the distributed environment. Additionally, a program may request services from a tool on behalf of another program. The preferred embodiment discloses the invention with respect to a tool such as a debugger. However, the invention is applicable to other tools including, but not limited to, trace collection tools and compilers. Although the preferred embodiment discloses the invention in context of external programs running in a relational database management system (RDBMS) and transaction programs running in a transaction monitoring system, the invention is applicable to other database management systems (DBMS) including, but not limited, to object-oriented database systems, to distributed objects, to other transaction monitoring systems, to message queuing systems, and to other software systems, in general.

The invention is an "application program initiated" debugging mechanism. A typical implementation may include both a debugger initiated mechanism and the application program initiated debugging mechanism of this invention. For example, a debugger may initiate debugging with a client program. However, when the client program invokes a software system (e.g., a database management system, transaction monitoring system, or a message queuing system) and application programs are then executed under the control of the software system, the application programs can initiate a debugging session, or the software system can initiate the debugging session on behalf of the application programs.

More specifically, a first aspect of this invention allows a user program to initiate a request for debugging services and to locate a debugger that may be running on a different machine. This invention allows users to add a statement to their program in order to invoke a debugger library routine ("debugMe") to request debugging services from a debugger. After receiving the request, the debugger will dynamically attach a monitor/controller to the user's program and begin a debugging session. For example, after a CICS™ transaction begins executing in a CICS™ application server process, the user's transaction program calls a debugger library routine named DEBUGME to locate and send a message to a particular debugger requesting debugging services. The debugger will attach a monitor/controller to the application process that executed the debugMe routine and add an entry for that process to a list of processes that it's debugging.

A second aspect of this invention allows a program to request debugging services on behalf of another program by invoking a library routine ("debugIt"). For instance, the software system can request debugging services on behalf of an application program. In this case, the user's application program does not need to be modified. For example, after a CICS™ transaction is dynamically loaded into the CICS™ application server process, CICS™ can call a debugger library routine named DEBUGIT to send a message to a particular debugger. The call to the debugIt routine specifies all of the information necessary for the debugger to locate the user's program including the internet ID of the machine, address-space ID (e.g., UNIX™ process ID), and thread ID. Also included is the information necessary to obtain authorization for the debugger to attach a monitor/controller to the user's program (i.e., login ID and password) as well as the instruction address in the user's program where the debugging session should begin (e.g., the entry point of the user's program). The debugger would then attach a monitor/controller to the application process and add that process to the list of processes it is debugging.

To locate a debugger, a tool locator mechanism is used. To locate a debugger, the tool locator can identify a machine and a port (typically, also the process) within a machine in which a debugger is running. The tool locator returns a communication endpoint address of a desired debugger so that a connection can be established with the debugger. The program sends a search criteria to the tool locator to identify which debugger it wants, such as a debugger that is running on a certain machine. The tool locator, will then return a session list which is a list of all debuggers that meet the search criteria requested.

In a preferred embodiment, the invention is used in conjunction with a parallel and distributed debugger having a front-end that is running on different machine than the machine running the program to be debugged. A program initiates a first routine that identifies a program to be debugged, and then initiates a second routine to locate, via the tool locator, a front-end of a debugger to have a back-end of the debugger from another machine attach to the program to be debugged.

In this way, a dynamic connection can be made, at run time, within a network of processing systems, between an application program and a remote tool. The application program can initiate the request for services of a desired tool without knowing, initially, the location of the tool within the network. The tool locator provides the information necessary, independently of the application program, to make the dynamic connection at run time between the application program and a remote tool.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

For purposes of the following description, the following definitions will be used. A software system is a database management system, or a transaction monitoring system, or a message queuing system (e.g., work flow systems), or similar system which provides processing services to client programs. A software system can also be defined as middleware which is defined as software functions that reside between the operating system and applications. A client program or client application will refer to an application program that invokes the software system to request the services of the software system. The client program may either be a previously created program or one entered interactively by a user using an interactive SQL interface. The client program will typically run on a client machine separate from the machine running the software system, but they could be on the same machine. An external program is a program written in a host language other than the SQL language, itself. External programs include stored procedures, triggers, user-defined functions or other user code that is invoked by, and under the control of, the software system, e.g., the database management system, but is external to, and not a part of, the software system, and is a separate executable from the client program. A transaction program is invoked by, and under the control of, a transaction monitoring system but is external to, and not a part of the software system, and is a separate executable from the client program. An application program or user program is an external program or a transaction program or client program or other user code.

A preferred embodiment of the invention integrates the invention into a Parallel and Distributed Dynamic Analyzer (PDDA) debugger to debug distributed middleware (e.g., CICS™/6000, DCE, and DSOM) and DB2™/6000 application programs. Although the preferred embodiment of the invention is based on the PDDA debugger, any distributed and/or parallel debugger could be implemented together with this invention. Also, a serial debugger could be implemented with this invention as it is known to adapt serial debuggers to a distributed environment. In addition, although the following invention is described with reference to a debugger, the invention can be implemented with any application development tool such as trace collection tools, compilers, etc.

To understand the context of this invention, a brief description of the architecture of PDDA follows. A more detailed description of the PDDA debugger is given further below.

Overview of the PDDA Debugger

Figure 1:
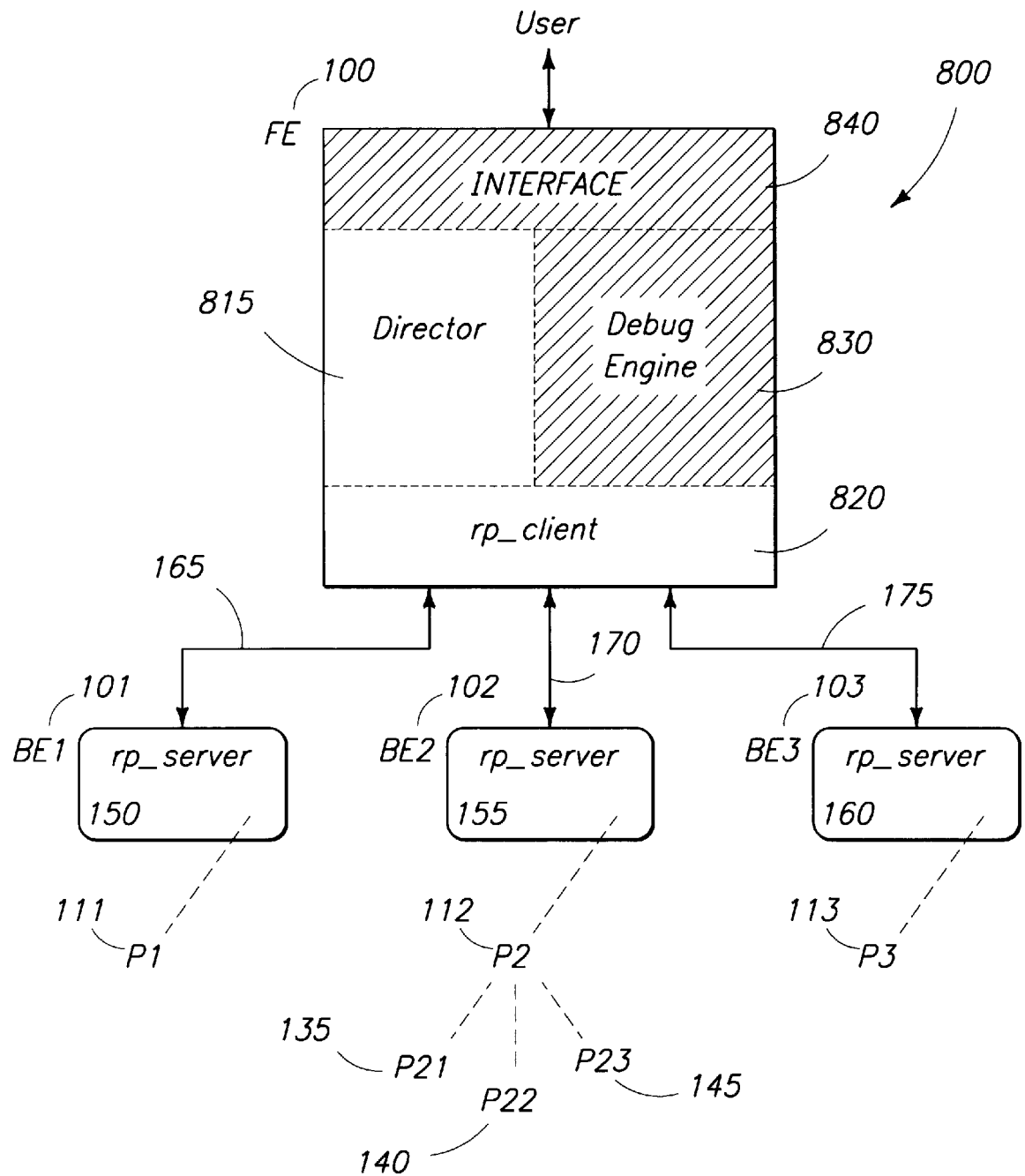
FIG. 1 is pictorial block diagram representation of a debugger component architecture of the Parallel and Distributed Dynamic Analyzer (PDDA) debugger for multiple client/server programs in accordance with the present invention.

PDDA is a debugger for parallel and distributed applications using Open Software Foundation's Distributed Computing Environment (DCE). The PDDA debugger has also been extended to support the debugging Distributed System Object Model (D-SOM) application. As shown in FIG. 1, the PDDA debugger includes a front-end 100 and one or more back-ends 101, 102, 103 which are attached to the processes that are running the application programs using the underlying debugging support of the operating system (e.g., the AIX™/6000 "ptrace" function). The back-ends provide functions of monitors/controllers as illustrated in FIG. 1. The front-end 100 provides a single user interface and handles most of the initialization and parallel execution control issues. The front-end 100 creates a back-end 101, 102, 103 for each program 111, 112, 113 involved in the application. The back-end 101 runs on the same machine as the application program 111. The back-end 101 carries out requests from the front-end 100 to monitor and control the application program 111. This includes: reading and writing the program state, starting and stopping the execution of the program, and monitoring the program for interrupts (e.g., breakpoint, floating point exception, etc.).

Overview of the Invention

A back-end 101 (FIG. 1) can either be created during debugger initialization or it can be created dynamically during the debugging session by using this invention. When the back-end is created during initialization, the program to be monitored and controlled must be specified at initialization. When the back-end is created dynamically, the program to be monitored and controlled is NOT specified at debugger initialization; instead the program will call a debugger library routine to request debugging services from a particular instance of a distributed debugger. A program can request debugging services for itself or for another program.

One of the major extensions to the distributed debugger that was needed to support the debugging of DB2™/CS external programs is the herein described "Dynamic Connection" component. This component enables an application program to locate a distributed debugger front-end in a distributed environment at run-time and to send it a message requesting debugging services. The debugger will then attach a back-end (monitor/controller) to the process for which debugging services is requested.

Architecture of the Invention

The following are definitions of various terms that will be used to describe this invention:

| | |
|---|---|
| DEBUGEE | A program that is to be debugged. |
| DEBUGGER SERVER | A program that provides debugging services (e.g., a distributed debugger front-end). |
| DEBUGGER CLIENT | A program that sends a request to a debugger server to start a debugging session on a debugee. The debugee can be the debugger client itself, or another program running anywhere on the network. |
| MONITOR/CONTROLLER | A program that is attached to the debugee by the debugger server to monitor and control its execution and read and write state information (e.g., a distributed debugger back-end). |

The debugger client will call a debugger library routine to send a message to a debugger server that contains the information necessary for the debugger server to locate the debugee and obtain authorization to start a debugging session. Additionally, the message will include the instruction address in the debugee where the user would like the debugging session to begin (e.g., the current instruction address of the debugee or at entry to a routine in the debugee program).

The debugger server may or may not be running on the same machine as the debugee. To locate the debugger server a component named TOOL LOCATOR is used. The debugger client and debugger server can communicate with the tool locator through a socket connection such as a connectionless internet family socket that is bound to an internet address specified in an environment variable named TOOLLOCATORHOST, and a reserved well-known port.

Figure 2:
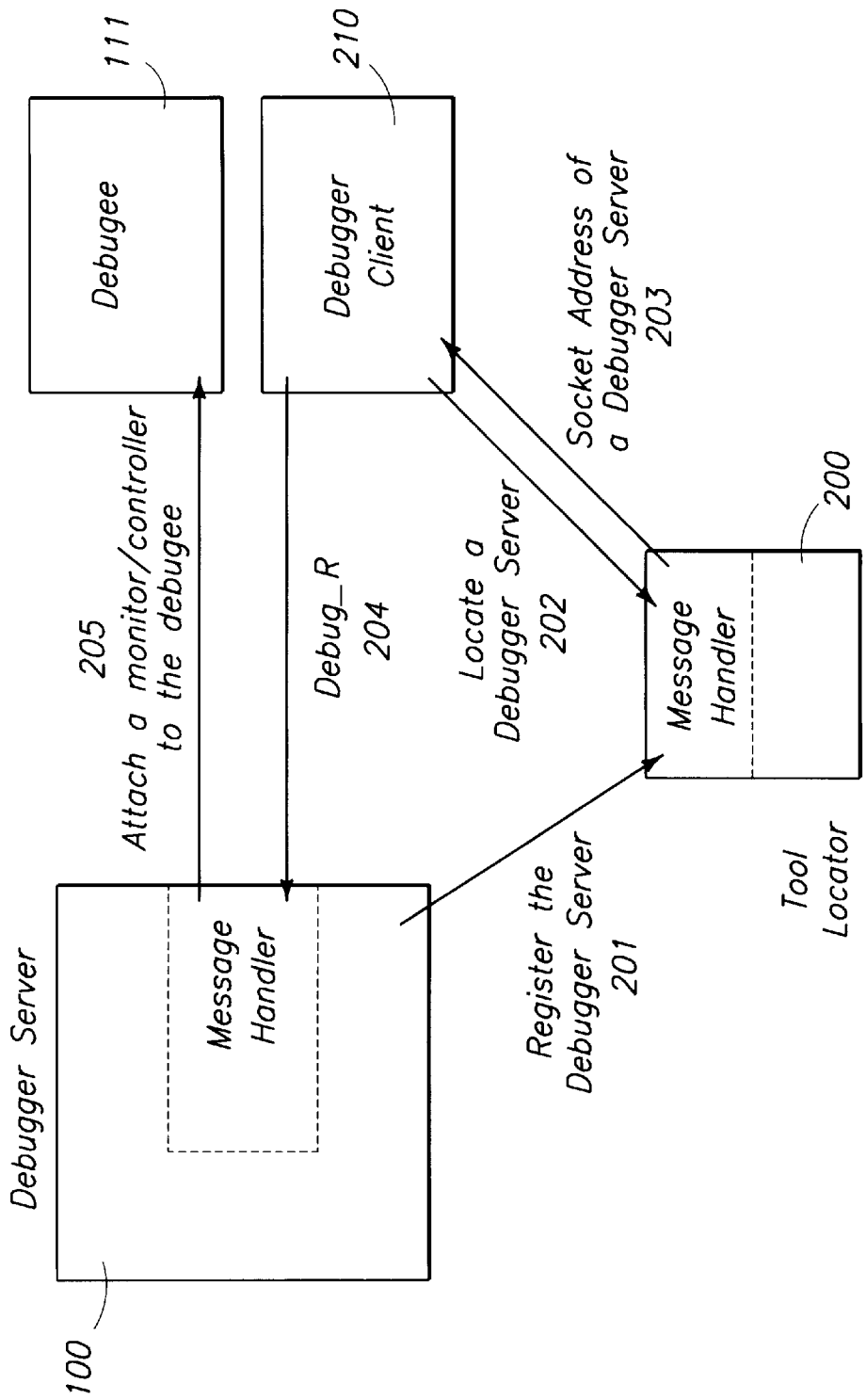
FIG. 2 illustrates a dynamic connection to a debugger in a distributed environment, and more specifically, the steps for the case where a client requests debugging services for another program.

FIG. 2 shows the steps of a debugger client requesting debugging services for another program. When a debugger server 100 is started, it will register itself with the tool locator 200, (message 20, FIG. 2) indicating that it is available to service debugging requests. A debugger client 210, can then send a message 204 to request debugging services for itself or for another program running on the network. It does this by first sending a message 202 to the tool locator to locate a debugger server specified by the debugger client 210. The tool locator 200 will return the socket address of a debugger server that matches the debugger client's specification, message 203. The debugger client 210 then sends a "debugIt" message 204 to the debugger server 100 to request debugging service from the debugger server. The debugger server 100 will then attach a monitor/controller 101 (FIG. 1) to the debugee 111, message 205.

Tool Locator

The tool locator is a general purpose mechanism for locating programs that have certain properties in a distributed environment. An application program (i.e., the debugger client) can call a debugger library routine which will use the tool locator to find a distributed debugger front-end (i.e., the debugger server) which has registered with certain properties such as the user ID its running under, the machine its running on, the X-Windows display its using, the programming languages and operating systems it supports, etc.

When a distributed debugger front-end is started, it can call a debugger library routine to register with the tool locator passing to it a string that contains a list of the form "property-name=property-value" separated by commas. This string is referred to as the "property list". For example, the string:

"hostname=atlantic,userid=hpan,opersys=AIX,language=C, language=CP P"

could be used to indicate that the distributed debugger is running on a host named "atlantic" under the user ID "hpan" and that it supports the debugging of programs written in C and C++ on AIX™.

The following is the grammar for the property list:
property-list:
    one-property|one-property, property-list;
one-property:
    property-name=property-value;
property-name:
    string;
property-value:
    string;

A "string" is an sequence of alpha-numeric characters and all special characters except "=" and ",".

The application program could then execute the debugMe debugger library routine specifying a search criteria as one of its arguments to indicate that it is looking for any debugger front-end running under the user ID "hpan" that supports C++ on AIX™.

The search criteria argument is a string that contains conjunctions and disjunctions of "property-name=property-value" pairs. Parenthesis can be used to specify precedence. There are no predefined property names or property values, they are simply arbitrary sequences of case insensitive alpha-numeric characters.

For example, the string:
"userid=hpan and machtype=rs6000 and opersys=AIX and language=C and language=CPP"

could be used to locate any debugger front-end running on any host under the user ID of "hpan" that supports the debugging of C and C++ programs running on a AIX™ on a RISC System/6000.

For another example, the string:
"opersys=WindowsNT and language=CPP and machtype= PowerPC and ((userid=hpan and hostname=davinci) or (userid=meier and hostname=atlantic) or userid=fuh)"

could be used to locate any distributed debugger front-end that supports programs written in C++ for Windows NT™ on a PowerPC™ that is either running under the user ID of "hpan" on a host named "davinci" or running under the user ID of "meier" on a host named "atlantic" or running under the user ID of "fuh" on any host. All of the above examples, including, but not limited to, expressions using "AND," "OR," "NOT", etc., can be broadly categorized as expressing the search criteria in a boolean expression.

The tool locator would then return a socket address of the first debugger front-end that matches the criteria to the debugMe routine. If more than one debugger font-end matches the search criteria then their socket address can be retrieved by subsequently executing a series of "FindNext" debugger library calls to the tool locator. The debugMe routine will use the socket address to create a socket connection and send a message to the debugger font-end requesting it to attach a monitor/controller to the process that is running the external program.

The following is the grammar for the search criteria:
search-criteria:
    search-and|search-criteria OR search-and;
search-and:
    one-property]search-and AND one-property;
one-property:
    property-name=property-value](search-criteria);
property-name:
    string;
property-value:
    string;

A "string" is a sequence of alpha-numeric characters and all special characters except "=" and ",". The "AND" operator has higher precedence than the "OR" operator.

Application Program Interface

The tool locator has an application program interface (API) that can logically be broken down into 2 sets of routines. One set of routines is called by a debugger server, and the other set of routines is called by a debugger client. In the preferred embodiment, all communication is done by using internet sockets.

Routines Called by the Debugger Server

| CREATEREGISTEREDSOCKET | Create a socket and add its socket address to the tool locator registry. |
| --- | --- |
| CLOSEREGISTEREDSOCKET | Close a socket and delete its socket address from the tool locator registry. |
| STILLALIVE | Inform the tool locator that the debugger server is still available to provide debugging services. |

Routines Called by the Debugger Client

| BEGINSEARCH | Begin a search of the tool locator registry to locate a debugger server. |
| --- | --- |
| FINDNEXT | Get the socket address of the next debugger server that matches the given specification. |
| ENDSEARCH | End the search of the tool locator registry. |

Data Types

The following describes a set of data types used by the tool locator.

Socket Address

In this invention a pair of sockets are used for communication between:

The debugger server and the tool locator.

The debugger client and the tool locator.

The debugger client and the debugger server.

Each socket is bound to a socket address. These socket addresses are used by the socket library routines to locate the two end-points of the communication. The following is the C language definition of a socket address.

typedef struct {
    unsigned char len;
    unsigned char family;
    unsigned short port;
    unsigned long addr;
    } socketaddress_t;

Where:
LEN is the length of the socket address (always 6).
FAMILY is the socket family (always AF_INET).
PORT is the port address of the socket.
ADDR is the 32 bit internet address of the machine.

The tool locator of this preferred embodiment supports only the internet type socket address (i.e., family type AF_INET).

Message

Messages are sent via socket communication using the RECVFROM, and SENDTO socket library routines. In a heterogeneous distributed computing environment there will be differences in the way that data is represented on different machine architectures. For example, integers are represented differently on a IBM™ RISC System/6000 than they are on an IBM™ PC. To handle these differences EXTERNAL DATA REPRESENTATION (XDR) library routines are used to encode all components of a message before a sendto routine is executed, and to decode the components of a message after the recvfrom routine is executed. The following is the C language definition of a message.

```
typedef struct {
unsigned char type;
char data[1000];
} message_t;
```

Where:

Type

A one byte unsigned integer that represents the message type that is used to identify a particular MESSAGE HANDLER routine. The valid values are:
1. register
2. unregister
3. still alive
4. begin search
5. find next
6. end search
7. debug it Data The rest of the message. This is decoded as appropriate by the message handler.

Tool Locator Registry

The tool locator registry is used and maintained by the tool locator to keep track of all of the registered debugger servers. When a debugger server is registered with the tool locator a structure is allocated and appended to the end of a linked list of structures. The following is the C language definition of a registry item.

```
typedef struct PROPERTYSTRUCT {
PROPERTYSTRUCT *next;
char *name;
char *value;
}
```

Where:
NEXT is a pointer to the next property item.
NAME is a character sting which contains the name of the property.
VALUE is a character sting which contains the value of the property.

```
typedef struct REGISTRYSTRUCT {
REGISTRYSTRUCT *next;
REGISTRYSTRUCT *previous;
PROPERTYSTRUCT *propertylist;
socketaddress_t sockaddr;
int interval;
time_t timestamp;
} registry_t;
```

Where:
NEXT is a pointer to the next registry item.
PREVIOUS is a pointer to the previous registry item.
PROPERTYLIST is a pointer to a linked list of properties.
SOCKADDR is socket address of the debugger server.
INTERVAL is frequency in seconds that the debugger server promised to send still alive messages. If 0 then the debugger server will not be sending any still alive messages.
TIMESTAMP is the time that the entry was initialized or the last time a still alive messages was received.

Search Session List

The search session list is used and maintained by the tool locator to keep track of all of the requests from debugger clients to search the tool locator registry for a debugger server. When a debugger client sends a begin search message, a structure is allocated that represents the search session list item. This item is appended to the end of the search session list. The following is the C language definition of a registry item.

```
typedef struct SESSIONSTRUCT {
SESSIONSTRUCT *next;
SESSIONSTRUCT *previous;
socketaddress_t sockaddr;
char *searchcriteria;
registry_t *cursor;
} session_t;
```

Where:
NEXT is a pointer to the next search session item.
PREVIOUS is a pointer to the previous search session item.
SOCKADDR is a socket address of the debugger client. This socket address is used as the key to the search session list.
SEARCHCRITERIA is a string that contains the search criteria that was specified as an argument of the call to the BeginSearch routine.
CURSOR is a pointer to the registry item that was found as a result of the most recent call to the FindNext routine.

Tool Locator API Routines

The following describes a set of Application Program Interface (API) routines provided by the tool locator. These API routines will be called by debugger servers and debugger clients.

RegisterTool Routine

Register a tool and an associated property list with the tool locator and return a connectionless internet family socket. The caller must supply a property list. The routine will return a connectionless internet family socket to the caller (i.e., the debugger server) which will be used to communicate with any of its debugger clients or the tool locator using the recvfrom and sendto socket library routines.

```
void RegisterTool(char *propertylist,
    int interval,
    int *dbgserversocket,
    int *status);
``` where:
PROPERTYLIST A string that contains a property list.
INTERVAL The debugger server promises to send a still alive message to the tool locator every interval seconds. If the tool locator stops receiving still alive messages from the debugger server, it can free up its entry in the tool locator registry. A value of 0 means that the debugger server will not be sending any still alive messages and therefore the tool locator should keep its tool locator registry entry until it receives an unregister message.
DBGSERVERSOCKET A pointer to a variable of type int where a socket is returned that can be used by the debugger server to communicate with any of its debugger clients.

STATUS A pointer to an int where the status code is returned. The values returned will be one of:

| | |
|---|---|
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |

StillAlive Routine

Inform the tool locator that the debugger server is still available. Its C declaration is:

void StillAlive(int dbgserversocket, int *status);

where:

DBGSERVERSOCKET The socket that was returned by the call to RegisterTool. This socket is used by the debugger server to communicate with its debugger clients and the tool locator.

STATUS a pointer to an int where the status code is returned. The values returned will be one of:

| | |
|---|---|
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| INVALID_SOCKET | The specified socket is not valid. |

UnregisterTool Routine

Close a socket that was created by RegisterTool and remove it from the tool locator registry. Its C declaration is:

void UnregisterTool(int dbgserversocket, int *status);

where:

DBGSERVERSOCKET The socket that was returned by the call to CreateRegisteredSocket. This socket is used by the debugger server to communicate with its debugger client and the tool locator.

STATUS a pointer to an int where the status code is returned. The values returned will be one of:

| | |
|---|---|
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| INVALID_SOCKET | The specified socket is not valid. |

BeginSearch Routine

Begin a search of the tool locator registry to locate a debugger server. A search criteria can be specified.

To search the tool locator registry the debugger client executes a call to BeginSearch specifying a search criteria. The debugger client will then make one or more calls to FindNext. Each call will return the socket address of a debugger server that matches the search criteria specified on the BeginSearch call. Once a suitable debugger server is found, a call to EndSearch is made to end the search.

The BeginSearch routine will create a connectionless internet socket and return it to the caller (i.e., the debugger client). This socket is used to communicate with the tool locator and must be passed on all subsequent calls to FindNext and EndSearch. The EndSearch routine will close the socket. The C declaration for this routine is:

void BeginSearch(char *searchcriteria, int *dbgclientsocket, int *status);

where:

SEARCHCRITERIA A string that contains a search criteria.

DBGCLIENTSOCKET A pointer to a variable of type int where a socket is returned that can be used by the debugger client to communicate with the tool locator.

STATUS a pointer to an int where the status code is returned. The values returned will be one of:

| | |
|---|---|
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |

FindNext Routine

Find the next debugger server and return a socket address that can be used to communicate with that server. The C declaration for this routine is:

void FindNext(int dbgclientsocket, socketaddress_t *dbgserversockaddr, int *status);

where:

DBGCLIENTSOCKET The socket that was returned by the call to BeginSearch. This socket is used by the debugger client to communicate with the tool locator.

DBGSERVERSOCKADDR A pointer to a variable of type socketaddress_t where the socket address is returned that the debugger client can use to communicate with the debugger server.

STATUS a pointer to an int where the status code is returned. The values returned will be one of:

| | |
|---|---|
| ERROR_STATUS_OK | normal completian |
| NO_MORE | No more debugger servers can be found. |
| NO_BEGIN_SEARCH | A call to BeginSearch must be made before calling FindNext. |
| NO_TOOL_LOCATOR_HOST | The environment variable TOOLLOCATORHOST is not set. |
| TOOL_LOCATOR_NOT_RESPONDING | The tool locator is not responding. |

EndSearch Routine

End the search of the tool locator registry and close the socket that was created by the BeginSearch routine. The C declaration for this routine is:

void EndSearch(int dbgclientsocket, int *status);

where:

DBGCLIENTSOCKET The socket that was returned by the call to BeginSearch. This socket is used by the debugger client to communicate with the tool locator.

STATUS a pointer to an int where the status code is returned. The values returned will be one of:

| | |
|---|---|
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| NO_BEGIN_SEARCH | A call to BeginSearch must be made before calling EndSearch. |

Tool Locator Message Handler Routines

These routines handle messages that are received from various debugger clients and debugger servers via a connectionless internet socket that is bound to the well known port address of the tool locator.

The recvfrom and sendto socket library routines are used to communicate with the debugger clients and debugger servers. The recvfrom will read both a message and the socket address of the debugger client or debugger server that sent the message. This socket address is used to send response back via the sendto routine and to uniquely identify a session between the tool locator and a debugger client or debugger server.

Register Message Handler Routine

The register message contains a property list and the frequency, in number of seconds, that the debugger server promises to send still alive messages. The socket address of a debugger server is returned by the recvfrom socket library routine call. An item is appended to the end of the tool locator registry which includes the property list, the debugger server socket address, and the frequency that still alive messages will be sent by the debugger server.

Still Alive Message Handler Routine

The still alive message contains a socket address which is used to locate the tool locator registry entry for the debugger server. A time-stamp in this entry is updated to indicate the last time the tool locator heard from the debugger server. If the tool locator doesn't receive a still alive message from a debugger server after a certain number of seconds that was specified when the debugger server was registered, then its entry will be removed from the tool locator registry.

Unregister Message Handler Routine

The unregister message contains a socket address which is used to delete the tool locator registry entry for the debugger server. Before the tool locator registry entry is deleted, all of the items in the search session list are examined to determine if the current cursor points to the registry entry that will be deleted. If it does, then the current cursor is set to the previous tool locator registry entry. If there is no previous entry, (i.e. we are deleting the first entry in the tool locator registry), then the current cursor is set to NULL.

Begin Search Message Handler Routine

The begin search message contains a search criteria. The socket address of a debugger client is returned by the recvfrom socket library routine call. An item is added to a search session list which is keyed by the socket address of the debugger client. The new search session item will contain information such as the search criteria and the current cursor position in tool locator registry (see "Search Session List").

Find Next Message Handler Routine

The find next message does not contain any data. The socket address of a debugger client is returned by the recvfrom socket library routine call.

The socket address of the debugger client is used to locate a search session list item that was created by the begin search message handler. The item contains the current cursor position in the tool locator registry. The first time a find next message is received, the cursor position will be at the beginning of the tool locator registry. A search of the tool locator registry is done using the search criteria specified in the begin search message from the debugger client. The search criteria is applied to each of the property lists stored in the tool locator registry entries. These property lists were previously supplied by the various debugger servers when they registered with the tool locator.

When a match occurs, the socket address of the debugger server from the tool locator registry is written back to the debugger client. The current cursor position in the search session list item is updated to point to the matched tool locator registry item.

End Search Message Handler Routine

The end search message does not contain any data. The socket address of a debugger client is returned by the recvfrom socket library routine call.

The socket address of the debugger client is used to delete the entry from the search session list.

Tool Locator Control Flow

Figure 3:
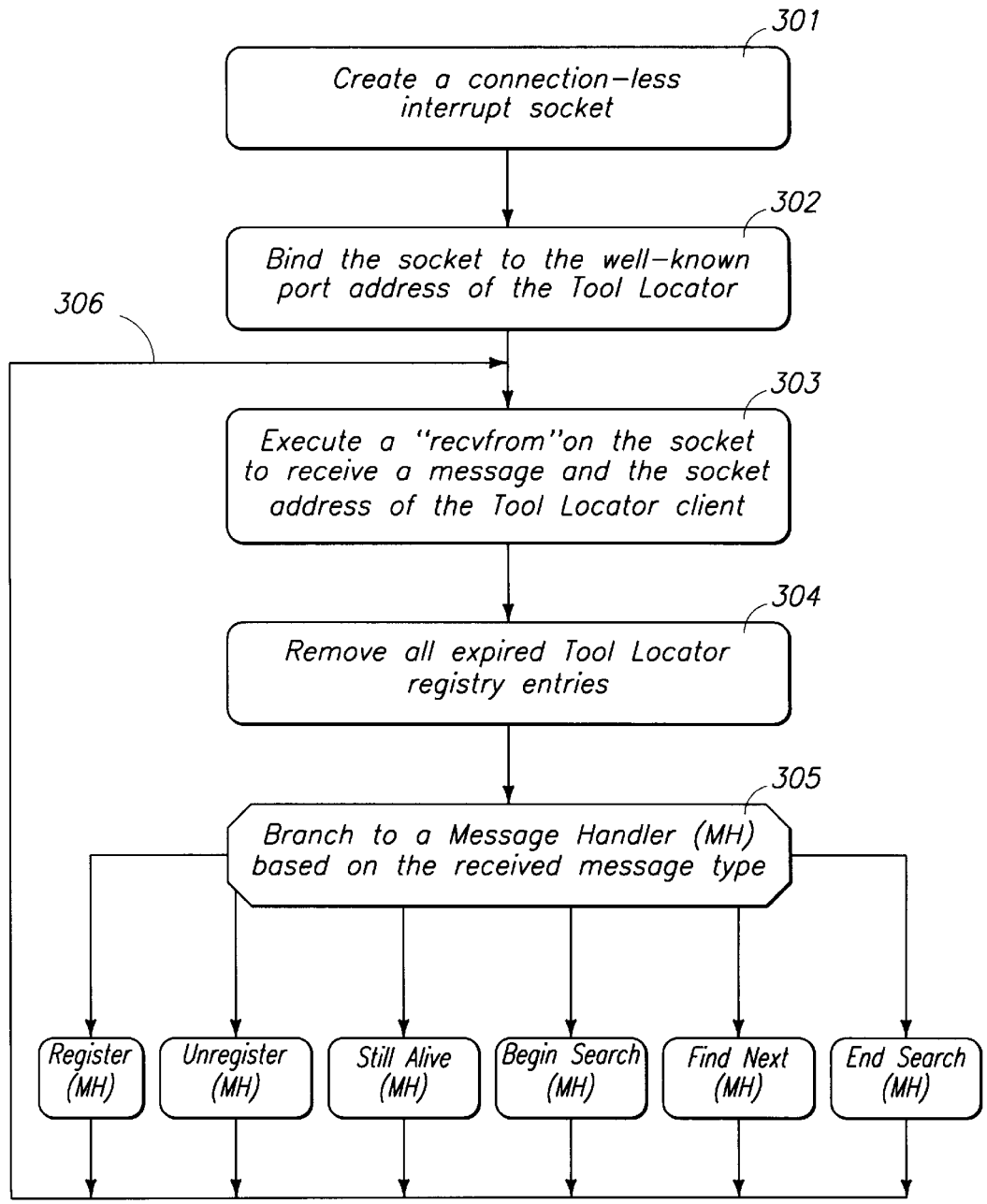
FIG. 3 illustrates the tool locator control flow.

A daemon process is needed for the tool locator and is invoked according to the following steps as shown in FIG. 3, which illustrates the control flow of a tool mapper daemon.

Step 301: Create a connectionless internet socket.

Step 302: Bind the socket to the well-known port address of the tool locator.

Step 303: Execute a recvfrom on the socket to receive a message and the socket address of the tool locator client.

Step 304: Remove all expired tool locator registry entries.

Step 305: Call a message handler routine based on the received message type.

Step 306: Go to 303.

Debugger

Debugger Client Application Program Interface

Debugger clients will call the following two application program interfaces (API) routines provided by the debugger library to request debugging services.

DebugIt Routine

A call to the debugit routine is made passing a search criteria which is used to locate a debugger server. The arguments to the debugit routine include all of the information necessary for that debugger server to locate a particular application program and attach a monitor/controller to it.

void debugit(char *searchcriteria, char *inetaddr, char *userid, char *password, int addrspaceid, int threadid, unsigned int instraddr; char *dbgservargs, int *status);

where:

| | |
|---|---|
| SEARCHCRITERIA | A string that contains the search criteria described above. If NULL is specified, then the current value of the DEBUGSEARCHCRITERIA |

-continued

| | |
|---|---|
| | environment variable will be used. |
| INETADDR | The internet address of the machine where the debugee is running. |
| USERID | The user ID that the debugee is running under. |
| PASSWORD | The password of the user ID that the debugee is running under. |
| ADDRSPACEID | The address-space ID (i.e., UNIX ™ process ID) that the debugee is running under. |
| THREADID | The thread ID that the debugee is running under. |
| INSTRADDR | The instruction address where the debugging session should begin. If zero is specified then the current instruction address of the debugee is used. |
| DBGSERVARGS | is a string that can contain arguments for the debugger (e.g. where to find source code). |
| STATUS | a pointer to an int where the status code is returned. The values returned will be one of: |
| ERROR_STATUS_OK | normal completion |
| DBG_NO_DEBUGGER_SERVER_FOUND | No debugger server found that matches the specified search criteria. |
| DBG_DEBUGGER_SERVER_REJECT | The debugger server has rejected the request for debugging services. |

Figure 4:
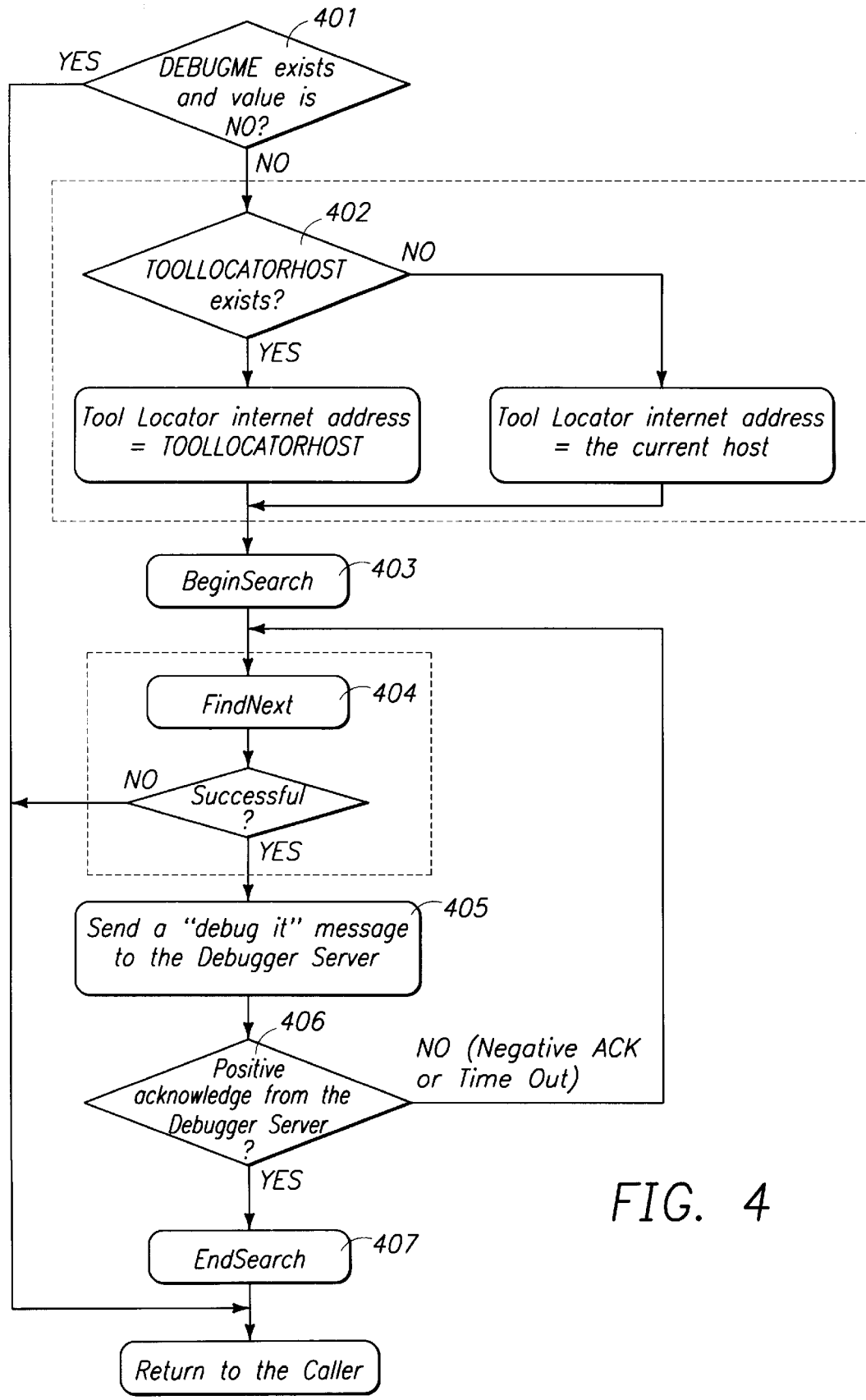
FIG. 4 illustrates the control flow of the client debugIt Routine.

For example:

debugIt("hostname=davinci and userid=hpan and language= CPP", "thistle.stl.ibm.com", "meier", "mypasswd", 35647, 1, 0, "-s /u/hpan/code -s /u/hpan/src", &status);

will cause the following to occur (refer to FIG. 4):

Step 401: Look for an environment variable named DEBUGME. If found and value is NO return to caller. Otherwise continue with next step.

Step 402: Look for an environment variable named TOOLLOCATORHOST that specifies the internet address of the tool locator. If the TOOLLOCATORHOST environment variable is not defined then the internet address of the current host is used.

Step 403: Execute a BeginSearch routine passing the search criteria. The BeginSearch routine will return a connectionless internet socket that is used to communicate with both the tool locator and the debugger server.

Step 404: Execute a FindNext routine which, if successful, returns the socket address of the corresponding debugger server. If there is a failure then return to the caller passing back the error status.

Step 405: Send a debug it message to the debugger server that includes all of the arguments of the debugit routine such as internet address, login ID, password, address-space ID, thread ID, instruction address and the debugger server arguments.

The message is sent to the debugger server by executing a call to the sendto socket library routine passing the socket returned by the BeginSearch routine and the debugger server socket address returned by the FindNext routine as arguments of the sendto call.

NOTE: This is an optimization to avoid creating a new socket just to send the one debug it message.

Step 406: Receive from the debugger server an acknowledgement message. If a negative acknowledgement is received or a timeout occurs then repeat the previous two steps until a status of no_more is returned from the call to FindNext.

Step 407: Execute a EndSearch to end the search session and close the socket.

DebugMe Routine

A call to the debugMe routine is made passing a search criteria which is used to locate a debugger server. In this case the debugee is the program that is currently running the debugMe routine. The debugMe routine calls the debugit routine passing the specified search criteria along with the current internet address, login ID, password, address-space ID, thread ID, and an instruction address which is the return address of the debugMe call.

void debugMe(char *searchcriteria, char *dbgservargs, int *status);

where:

| | |
|---|---|
| SEARCHCRITERIA | A string that contains the search criteria described above. If NULL is specified, then the current value of the DEBUGSEARCHCRITERIA environment variable will be used. |
| DBGSERVARGS | is a string that can contain arguments for the debugger (e.g. where to find source code). |
| STATUS | is a pointer to an int where the status code is returned. The values returned will be one of: |
| ERROR_STATUS_OK | normal completion |
| DBG_NO_DEBUGGER_SERVER_FOUND | No debugger server found that matches the specified search criteria. |

| -continued | |
|---|---|
| DBG_TOOL_LOCATOR_FAILURE | A call to the tool locator failed. |
| DBG_NO_TOOL_LOCATOR_FOUND | No tool locator found. |

For example:

debugMe("hostname=davinci and userid=hpan and language=CPP", "-s /u/hpan/code", &status);
will cause the debugit routine to be called passing the current internet address, login ID, password, address-space ID, thread ID, and the return address of the debugMe routine. The string "-s /u/hpan/code" will be used by the debugger server to locate the source code.

Debugger Server Message Handler Routine

This routine handles messages that are received from various debugger clients via a connectionless internet socket that is created by the RegisterTool routine.

The recvfrom and sendto socket library routines are used to communicate with the debugger clients. The recvfrom will read both a message and the socket address of the debugger client that sent the message. This socket address is used to send the response back to the debugger client via the sendto routine.

Debug it Message Handler Routine

The debug it message contains the internet address, login ID, password, address-space ID, thread ID, instruction address of a debugee, and a debugger server argument string. The socket address of a debugger client is returned by the recvfrom socket library routine call.

If this is the first debug it message for the debugee, then the debugger server will parse the debugger server arguments string to set various debugger options, such as where to locate the source code, and then "attach" a monitor/controller to the debugee.

A breakpoint is set at the instruction address specified in the message and an acknowledgement message is sent back to the debugger client.

Implementation of The Dynamic Connection Mechanism

The following describes implementations of this dynamic connection invention to debug client/server application programs based on DB2™/6000 and CICS™/6000. In these two implementations, three ways are shown in which a debugee can be attached by a debugger server; 1) the debugee is started under the debugger server; 2) a third program referred to as a debugger client issues a "debugit" request specifying a debugee; 3) the debugee issues a "debugMe" request. In the third case, the debugee is also the debugger client.

Debugging DB2™/6000 Client/Server Application

Figure 5:
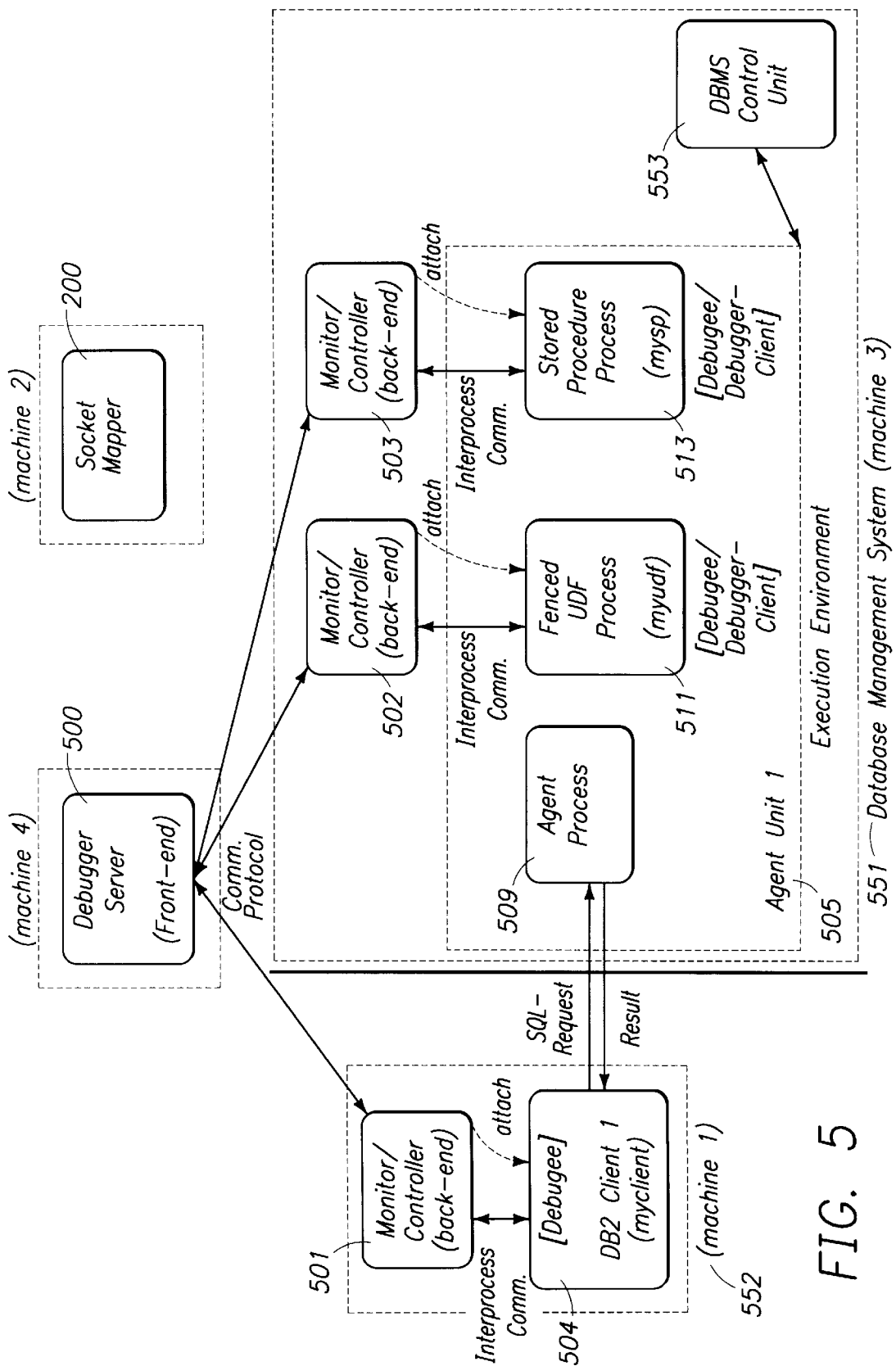
FIG. 5 illustrates a debugging environment of a DB2™/6000 application.

FIG. 5 shows a parallel and distributed debugger 500, 501, 502, 503, monitoring and controlling a DB2™/6000 application program. A client program "myclient" 504 is running in a process on machine 1, 552. DB2™/6000 external programs (i.e., stored procedure 513 and user defined functions 511) are executed under the control of DB2™/6000 system on machine 3, 551.

The DB2™/6000 system is a set of control processes, represented by the DBMS Control Unit box 553, created at database instance creation time. The control unit 553 listens for "connection" requests from clients 504. For each connection request, the control unit 553 spawns a new set of processes which is referred to as agent unit 505. The newly created agent unit is then connected to the corresponding client for receiving and serving the subsequent database requests. The agent unit consists of an agent process 509 and, optionally, a set of fenced UDF processes 511, and/or a set of stored procedure processes 513.

The agent process 509 runs the major part of the database engine code and is, therefore, also referred to as the "database engine". The agent process 509 takes the request from the client and distributes the request to various service components of the database engine to accomplish the requested action. Besides the database engine code, the agent process also runs un-fenced UDF code.

A fenced UDF process 511 runs the run-time code which communicates with the agent process, dynamically loads the UDF library, and runs fenced UDF code. The number of fenced UDF processes varies from one implementation to another. For example, there could be one fenced UDF process shared by all the fenced UDFs invoked in a current application or there could be more than one such processes, each serves a set of fenced UDFs that are run under the same user ID.

In many aspects, a stored procedure process 513 has the same run-time characteristics as that of a fenced UDF process. Unlike fenced UDF process 511, a stored procedure process 513 runs the external program as if it were a stand alone application sitting on the server machine. In general, there could be more than one stored procedure process 513 associated with a client program.

In this example, the client program "myclient" 504 executes a stored procedure named "mysp" 513. The store procedure then executes a SQL SELECT command that contains a call to a fenced UDF named "myudf" 511. The database server loads the stored procedure (mysp) 513 and the fenced UDF (myudf) 511 in their own separate process on the same machine that the DBMS is running (i.e., machine 3), 551. A separate monitor/controller (debugger back-end), 501, 502, 503 will be "attached" to each of the processes that are running the client program, stored procedure, and user defined function using the "dynamic connection" mechanism.

Just before the external program is about to be executed in a stored procedure or fenced UDF process, a library routine is called to do the following two steps. First, the process checks to see if a monitor/controller is already attached to the current process. If not, the process will execute a debugMe library routine as illustrated in FIG. 2, to locate a debugger server and to obtain the socket address of the debugger server through the tool locator. The debugMe routine will then send a message to the debugger server to have it attach a monitor/controller to the current process (i.e., the debugee). Second, the process calls a particular library routine that executes a breakpoint which tells the debugger that an external program is about to be executed. The debugger will then run the current process to the first executable statement of the external program and execute a breakpoint. The application programmer is then able to debug the program by using the various debugger commands (e.g., line step, call step, display/modify variables, set breakpoints etc.)

After the external program returns, the current process calls a particular library routine that executes a breakpoint to notify the debugger about the ending of the external program. If the stored procedure or fenced UDF process can be shared between users (i.e., DB2™ client/server connections), the debugger will detach the monitor/controller from the process that ran the external program. If it cannot be shared between users, the debugger can leave the monitor/controller attached for better efficiency. This is particularly useful for UDFs which will generally be called many times for each SQL SELECT statement.

In the above example, the stored procedure process and fenced UDF process play the role of both debugger client and debugee.

Debugging Distributed CICS™ Application

Figure 6:
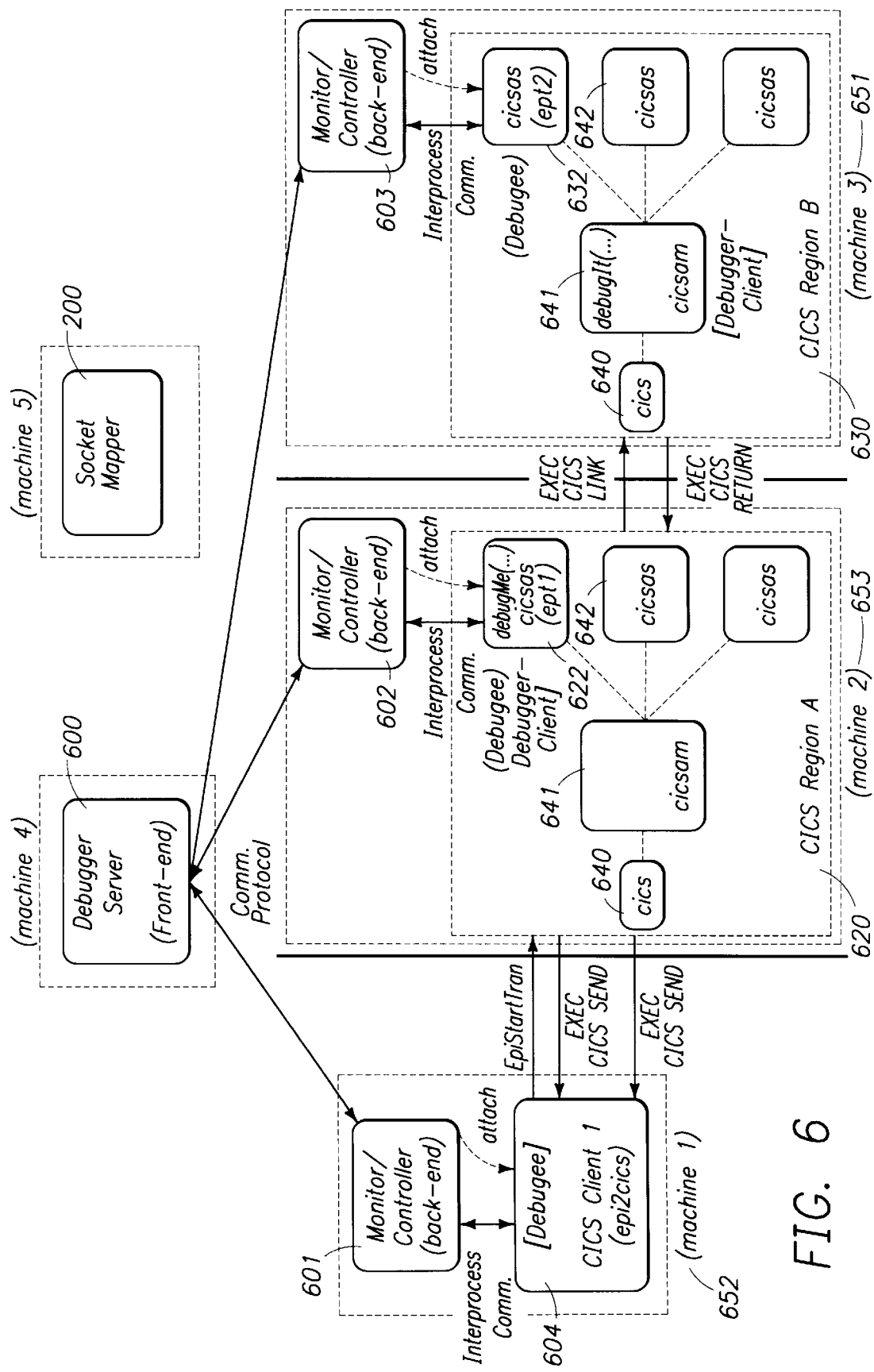
FIG. 6 illustrates a debugging environment of a CICS™/6000 application.

FIG. 6 illustrates the environment of debugging a distributed CICS™/6000 sample application. Each CICS™/6000 region, 620, 630, consists of many UNIX™ processes. The CICS™/6000 implementation includes the following system processes. The "cics" process 640 is a CICS™/6000 root process that is created at initialization. This process starts (spawns) other processes including "cicsam" 641. The "cicsam" is a CICS™/6000 application monitor and is responsible for managing CICS™ application servers (i.e., "cicsas") 642. Each "cicsas" process 622 is a CICS™/6000 application server where the individual CICS™ transaction programs are run.

This example of a distributed CICS™ application has a client program "epi2cics" 604, which is running on machine 1, 652, that uses the External Presentation Interface (EPI) to invoke the transaction "ept1," 622, in Region A, which is running on machine 2, 653. The "ept1" transaction program, in turn, uses the "EXEC CICS LINK" call to invoke a second transaction named "ept2," 632, in Region B, 630, which is running on machine 3, 651.

After the client program "epi2cics" invokes the "ept1" transaction, the CICS™ application monitor (cicsam) 641 for Region A 620 allocates an available application server (cicsas). The "cicsas" then arranges to have the application server dynamically load the associate transaction program and calls the UNIX™ system "sleep" routine (with a very large time value) right before it is about to execute the transaction program. Next, the application server (cicsas) 622 will invoke the debugMe library routine to locate a debugger server 600 (which is running on machine 4) and to obtain its socket address using the tool locator 200, also running on different machine, machine 5. The debugMe routine uses the socket address to send a "debug me" message to the debugger server (i.e., the debugger front-end) requesting service. The debugger server, in turn, attaches a monitor/controller 602 to the CICS™ application server (cicsas) process 622 that will run the transaction program. Once the monitor/controller 602 is attached to the application server process 622, the debugger will send the application server process a UNIX™ signal to wake it out of its sleep. The debugger will then run the application server to the first executable statement of the transaction program and execute a breakpoint. The application programmer is then able to debug the program by using the various debugger commands (e.g., line step, call step, display/modify variables, set breakpoints etc.)

The "ept1" transaction program 622 will eventually execute the "EXEC CICS LINK" command to invoke the "ept2" transaction 632 in Region B 630. The following steps will have the debugger server attach a monitor/controller to the application server process that runs the associated transaction program in Region B. The CICS™ application monitor (cicsam) 641 in Region B 630, will invoke the debugit library routine to locate a debugger server 600 (which is running on machine 4) and to obtain its socket address using the tool locator 200, also running on different machine, machine 5. The debugit routine uses the socket address to send a "debug it" message to the debugger server (i.e., the debugger front-end) requesting service. The debugger server, in turn, attaches a monitor/controller 603 to the CICS™ application server (cicsas) process 632 that will run the transaction program. Once the monitor/controller is attached to the application server process, the debugger will send the application server process a UNIX™ signal to wake it out of its sleep. The debugger will then run the application server to the first executable statement of the transaction program and execute a breakpoint. The application programmer is then able to debug the program by using the various debugger commands (e.g., line step, call step, display/modify variables, set breakpoints etc.)

After the "ept2" transaction completes, the CICS™ application server calls a particular library routine that executes a breakpoint to signal the debugger about the completion of the transaction program. The debugger then detaches the monitor/controller from the application server process and allows it to continue its execution.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory, transmitting, or other device, thereby making a computer program product, i.e., an article of manufacture, according to the invention. The article of manufacture containing the computer programming code may be made and/or used by executing the code directly from one or more media, by copying the code from one medium to another medium, or by transmitting the code over a network.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, although the foregoing specification described the dynamic connection invention based on a socket mechanism that is supported across many operating systems (e.g., AIX™, OS/2™, and MVS™), the invention could be implemented using other address locating mechanisms supported by other operating systems. In addition, although the invention has been described with reference to a CICS™/6000 implementation, the invention is applicable to other transaction monitoring systems, database management systems, message queuing systems, and other software systems. In addition, although the invention has been described with reference to distributed applications running in a distributed environment, the invention is applicable to application programs running on a single machine.
Description of a Method and System for Debugging Parallel and Distributed Applications Background The prior art for parallel and distributed debuggers is illustrated by serial debuggers and parallel and distributed debuggers. Serial debuggers are incapable of effectively debugging parallel and distributed applications (e.g., client/server, peer-to-peer, etc.). Parallel and distributed debuggers generally have required a complete instantiation of the debugger for every program that makes up the distributed application on each machine where the distributed application is running, thus yielding multiple debuggers and multiple user interfaces.

In view of the above, there is a need for a method of, and system for, debugging parallel and distributed applications having multiple programs with many threads of execution running on various machines on a variety of operating systems, from a single user interface.

Summary

One of the major inhibitors to developing parallel and distributed applications (e.g. client/server, peer-to-peer) is the lack of good debugging tools. To debug a parallel and distributed application the tool should provide dbx-like functions that will allow the user to monitor and control the execution of multiple programs with many threads of execution running on various machines. It must also allow the user to display and modify the run-time state of all of those programs in a coherent fashion from a single user interface. The present invention provides such a method for debugging parallel and distributed applications. This invention can be applied to debugging applications running on variety of operating systems including UNIX™, OS/2™, WINDOWS™, and MVS™.

Description

Figure 7:
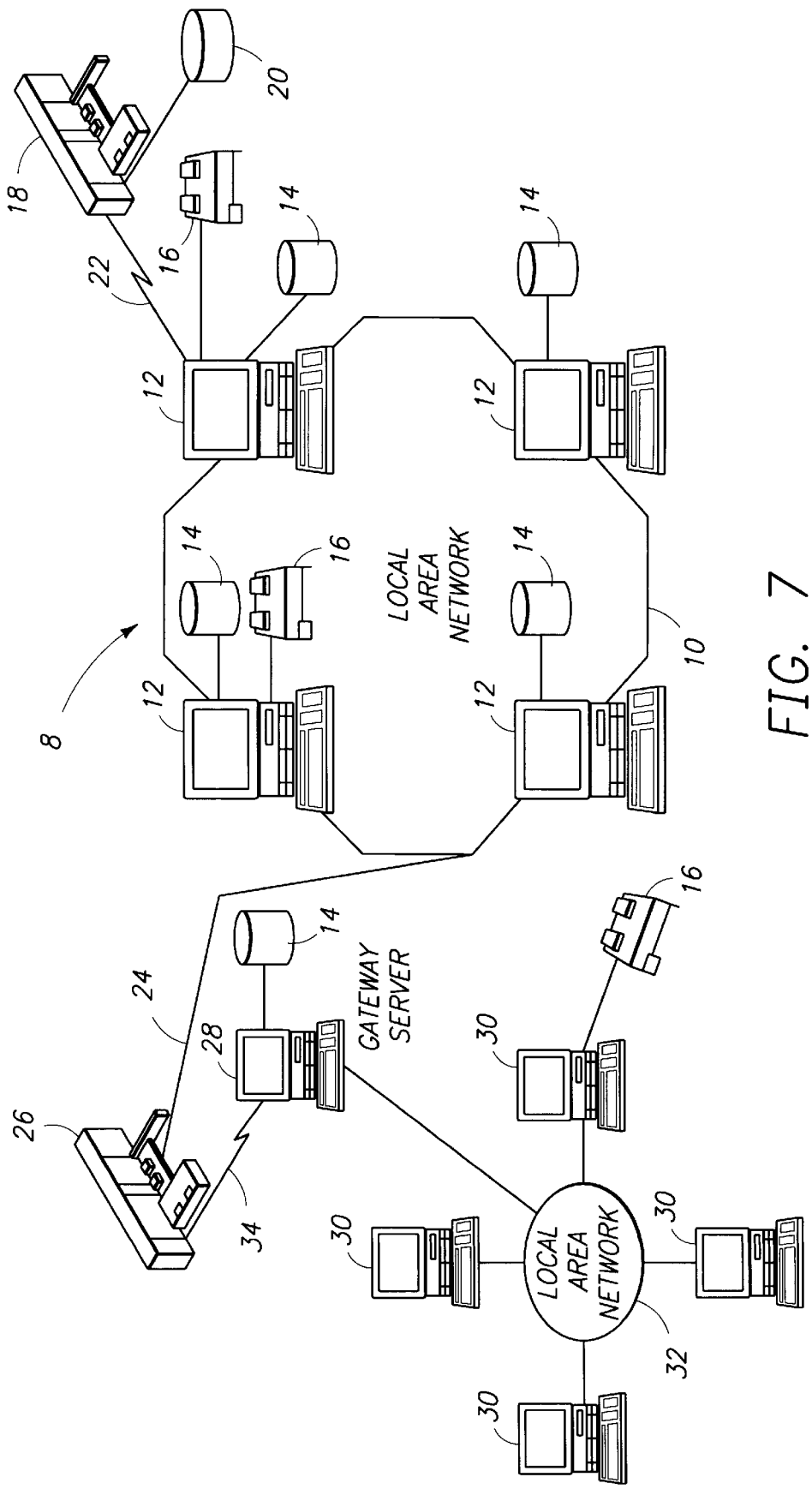
FIG. 7 is a pictorial representation of a distributed data processing system which may be used to implement the method of the present invention.

With reference now to the figures and in particular with reference to FIG. 7, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various computer programs which may be accessed, executed, and debugged by a user within data processing system 8, in accordance with the method of the present invention. In a manner well known in the prior art, each such computer program may be stored within a storage device 14.

Still referring to FIG. 7, it may be seen that data processing system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute computer programs on one or more portions of data processing system 8. For example, the user may execute an client computer program on computer 12 which requests services from a server program executing on mainframe 18 which further requests services from service routines executing on computer 30. To verify the proper operation of such a distributed set of client/server programs, the user may wish to debug the distributed set of client/server programs as if they were one single program. Therefore, it should be obvious that a need exists for a method whereby the user may debug the distributed set of client/server programs as if they were one single program.

Figure 8:
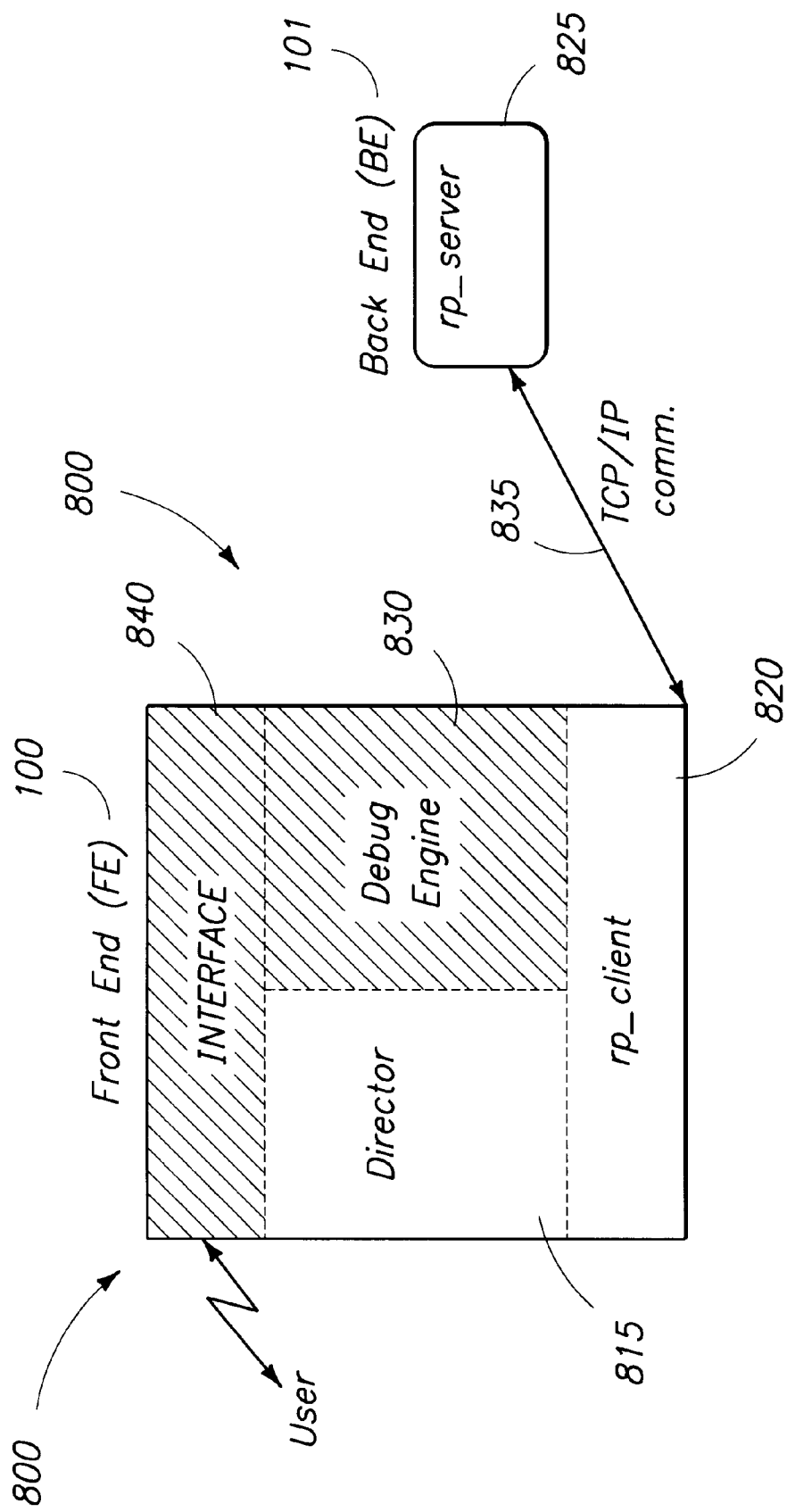
FIG. 8 is pictorial block diagram representation of a debugger component architecture in accordance with the present invention.

Referring now to FIG. 8, the preferred embodiment of the present invention is a debugger 800 which is itself a client/server application. It consists of a front-end 100 and one or more back-ends 101 as illustrated in FIG. 8 and FIG. 1.

This invention creates a Director 815 component which handles most of the initialization and parallel execution control issues and a rp_client 820 and rp_server 825 component which handles most of the distributed execution issues.

The Director 815 allows the Debug Engine 830 to be unaware of most of the parallel and distributed aspects of the application. Thus, the Debug Engine can be created by re-using a serial debugger for presenting the state information about the various programs that make up the application.

Back-End

Referring now to FIG. 1, a back-end (101, 102, and 103) is allocated for each program (111, 112, and 113) (i.e. client or server program) involved in the application. The creation of back-ends (101, 102, and 103) is done by the front-end Director component 815 when the debugger 800 is invoked. Each application program (111, 112, and 113) is monitored by its corresponding back-end (101, 102, and 103) during the debugging process. The back-end (101, 102, and 103) will execute requests from the front-end 100 to control the execution of the application program (111, 112, and 113) and read/write state information.

For the single client/server paradigm, which is a very common case, if the client or server program is on the same machine as the debugger front-end, then the program is directly monitored by the front-end (rp_client component) to avoid the overhead of allocating a back-end. This optimization is especially effective for debugging a non-distributed program that will eliminate the need to allocate a back-end.

In some operating systems, an address-space can create additional address-spaces. For example, a program running in a UNIX™ process (i.e. address-space) such as P2 112 can create additional processes (such as P21 135, P22 140, and P23 145) during execution by executing fork system call, and then load a new program into that process using the exec system call. The process for the application program 112 and all processes that it has created (135, 140, and 145) can be monitored by a single back-end 102. In addition, the back-end handles interrupt signals from those processes and passes information to the front-end as needed.

The rp_server component (150, 155, and 160) in the back-end (101, 102, and 103 respectively) is responsible for the communication with the rp_client component 820 in the front-end. The message requests that flow from the front-end to the back-end are:

Establish Connection
Establishes the connection between the front-end and the back-end.
Load A Program
Load a program and begin monitoring it.
Get Loader Information
Read information about a program that is currently loaded and being monitored by the back-end.
Read Program State
A request to read the value from a register or location in memory of a program being monitored by the back-end.
Write Program State
A request to write a value to a register or location in memory of a program being monitored by the back-end.
Start Execution
Start the execution of all the programs that are monitored by the back-end.
Wait For Interrupt
Determine if a interrupt (e.g. breakpoint) has occurred in any thread.
Stop Execution
Stop the execution of the programs that are monitored by the back-end.
Read Thread Information
Read information about a particular thread. The information sent back to the front-end includes the thread state (e.g. running, ready, waiting) and status (e.g. breakpoint, interrupted, floating point exception), current instruction pointer, and current frame pointer. This routine can be called iteratively to obtain information about all of the threads running in an address-space.
Unload A Program
Unload a program and stop monitoring it.
Quit
Terminate the back-end and disconnects it from the front-end.

The communication between the front-end and the back-end (835, 165, 170, and 175) can be implemented using any of a variety of standard protocols including TCP/IP, SNA, NETBIOS. The general model of the communication is Remote Procedure Call (RPC).

FIG. 1 illustrates an example of a multiple client/server UNIX™ application. Programs P1 111 and P3 113 each have one process only, but P2 112 spawns three processes (P21 135, P22 140, and P23 145) during execution. The communication functions of every back-end talks to the same component of the front-end, rp_client using SUN™ RPC running on a TCP/IP communications protocol.

Front-End

Referring back to FIG. 8, the debugger front-end 100 is composed of the Director 815, Debug Engine 830, Interface 840, and rp_client 820 components. The shadow area in FIG. 8 (i.e., Interface 840 and Debug Engine 830) are both re-used from a serial debugger with some modifications.

Note that it is very common for a serial debugger to be divided into an Interface component and a Debug Engine component. For example, dbx for AIX™/6000 supplies a programming interface between its command line processor and debug engine. This allows other debugger front-ends (e.g. xde or the workbench debugger) to re-use the dbx Debug Engine.

Director

The Director 815 allows the Debug Engine 830 and Interface 840 components to be unaware of most of the parallel and distributed aspects. A serial debugger will generally have a set of global variables that are used to record the state of the debugging session. For example, which breakpoints or watchpoints have been set, the location of the symbol table information, the name of the program that is currently loaded etc. In the present invention, the serial debugger's global variables will become fields of new data structures that are allocated by the Director component.

Figure 9:
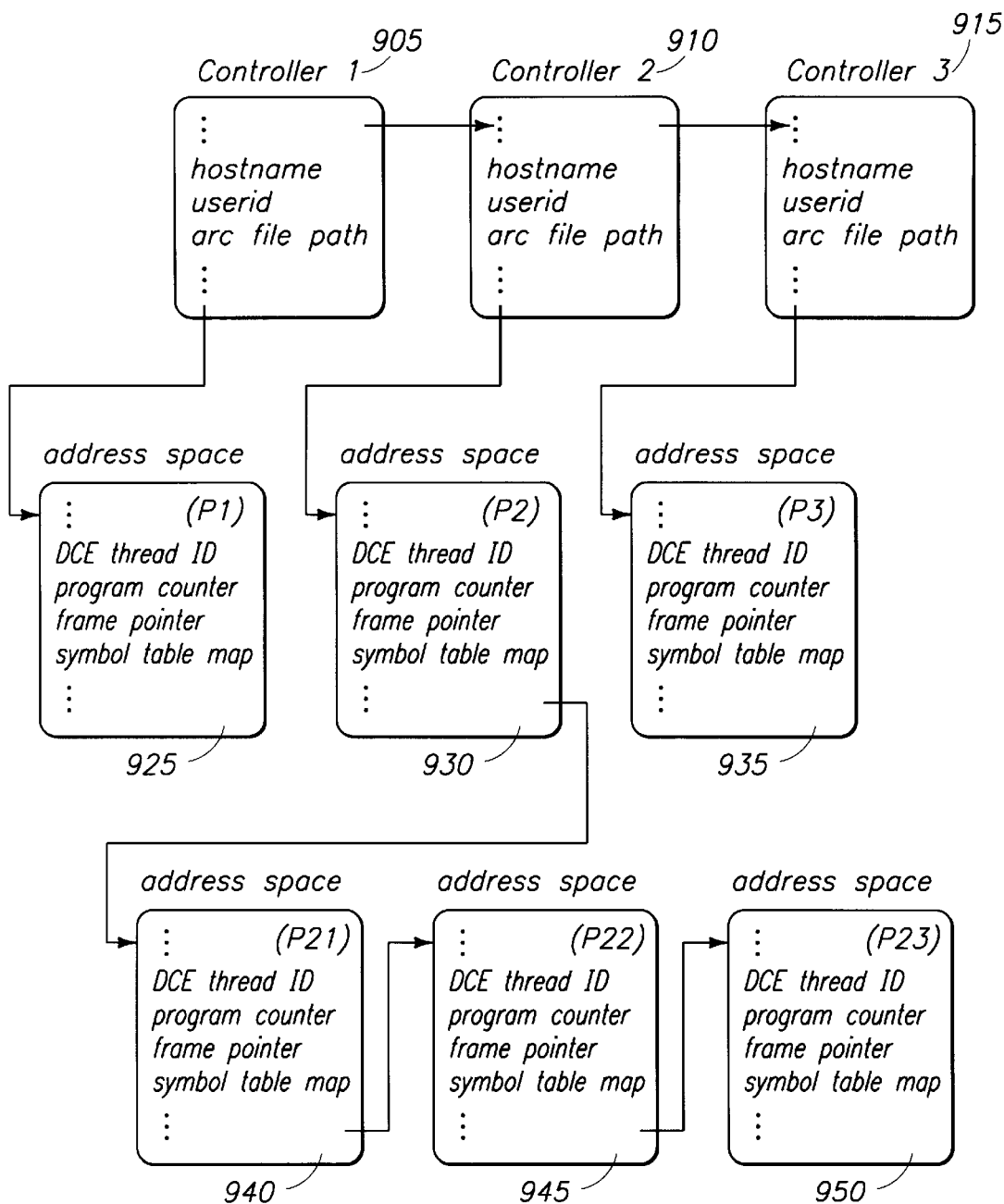
FIG. 9 is pictorial block diagram representation of controller and address-space data structures of a debugger front-end in accordance with the present invention.

Referring now to FIG. 9 for each back-end (101, 102, and 103) created during initialization, the Director 815 allocates a data structure called a controller (905, 910, and 915 respectively). The controller is used to record information such as the absolute path where the source code can be found, the hostname of the machine where the application program is executing, the name of the original program that was loaded etc.

The controller also points to a set of address-space data structures (925, 930, 935, 940, 945, and 950) that keep track of the current execution state for each program (e.g. UNIX™ process) that is being monitored by the back-end. The execution state includes the name of the program that is currently being executed, the ID of the current thread, the current program counter, a pointer to the current stack frame, and information about the most recent program interrupt. The address-space data structure also contains information such as: the setting of breakpoints and watchpoints, the location of the symbol table information, and the format of variables when they are displayed to the interface.

As an example, when the user requests the Interface component 840 to display a particular thread of an application 111, the Director 815 instructs the rp_client component 820 to send all future communications to the back-end 101 that is monitoring the selected thread 111. The Director 815 then makes assignments to a set of variables that point to the controller 905 and address-space data structures 925 which correspond to the specific machine, address-space, and thread that was selected.

A set of macros are defined to allow the routines in the Debug Engine 830 and Interface 840 components to access and update the serial debugger's global variables by de-referencing the fields in the selected controller and address-space data structures. Also, additional macros are written so that calls to read and write the program state will be handled by routines in the rp_client 820 and rp_server 825 components.

Therefore, the Debug Engine 830 and Interface 840 components can be coded as if they are debugging a single program. This technique minimizes the changes to the original source code from the serial debugger.

In response to a start execution command from the user, the Director 815 will supervise the execution of the parallel and distributed application. It starts the application by sending commands to each back-end (101, 102, and 103) to start or continue executing the programs (111, 112, and 113 respectively) they are monitoring. The Director 815 will then poll the back-ends (101, 102, and 103) for current status until one of the back-ends reports that a program it is monitoring has encountered a breakpoint, watchpoint, program interrupt, or termination. At that moment, the Director 815 will send a stop command to all other back-ends which in turn send an interrupt program execution signal (e.g., SIGINIT in UNIX™) to each of the programs they are monitoring. Meanwhile, the Director 815 tells the Interface 840 and Debug Engine 830 components which thread caused the application to stop. The Interface 840 is then called to allow the user to display and modify the frozen state of that thread. As a result, the Interface 840 will call the Debug Engine 830 to read and write the thread state.

Debug Engine

The Debug Engine component 830 is derived from an existing serial debugger which supports conventional serial debugging commands (e.g., symbol table resolution, setting breakpoints, step execution, etc.). It uses the set of macros mentioned above to allow the routines in the Debug Engine 830 to access and update the controller (905, 910, and 915) and address-space data structures (925, 930, and 935 respectively) that record the state of the debugging session and to read and write the program state. This component can be coded as if it is debugging a non-distributed serial program.

Interface

The Interface component 840 is also derived from the serial debugger. It uses the same set of macros defined above to access and update the controller (905, 910, and 915) and address-space data structures (925, 930, and 935 respectively) and to read and write the program state. This again minimizes changes to the original source code from the serial debugger.

This component needs to be modified so that it commands to start and stop the execution of the parallel and distributed application are sent to the Director component 815 rather than directly to the Debug Engine 830.

In addition, modifications are needed to list and select the various machines, address-spaces, and threads of the parallel and distributed application.

For example, if the debugger 800 has a window based interface 840 a new window could be added to list all of the machines, address-spaces, and threads involved in the application in an indented list:

machine1
  address-space1
    thread1
    thread2
    thread3
  address-space2
    thread1
    thread2
machine2
  address-space1
    thread1
    thread2
    thread3
  address-space2
    thread1
    thread2
    thread3

When the application is stopped the user can select any of the threads in that window by clicking on it. A call is made to a routine in the Director component 815 to set the current machine, address-space, and thread. Routines in the Interface component 840 are then called to re-draw the state of the selected machine, address-space, and thread.

In the case of a command driven non-window interface, two new commands need to be added: one to list the various machines, address-spaces, and threads; and a second one to set the current machine, address-space, and thread.

rp_client

The rp_client component 820 contains an Application Programming Interface (API) for a set of routines that are used to communicate with the various back-ends (101, 102, and 103). There is one routine for every type of message request that flows between the front-end 205 and back-end (101, 102, and 103). Also, there is a routine which is called by the Director 815 to specify which back-end to communicate with. The rp_client 820 marshalls the argument passed by the API call into a message and sends it to the back-end (101, 102, and 103) using a synchronous protocol (e.g. RPC) (835, 165, 170, and 175). Eventually, the rp_client 820 component will receive a response message from the back-end (101, 102, and 103) which contains return arguments. These arguments are unmarshalled from the message and passed back to the caller of the API routine. The rp_client component 820 communicates with only one back-end at a time that is specified by the Director 815.

Control Flows of Director

Initialization

The Director component 815 is invoked during the initialization of the debugger 800 to start the application running under the debugger 800. The application may be made up of multiple programs with many threads of execution running on various machines. The user needs to specify the various programs that make up the application. For each program the user needs to specify the program arguments, the host machine the program should run on, and the user ID the program should run under. In addition, the role the program plays with respect to client/server and peer-to-peer communication may be specified. The valid roles are client, server, both, peer-to-peer, or none. The Director component 815, for example, may use the role information to determine the order in which the programs need to be started (e.g., servers must start before clients). Optionally, additional information may be specified for passwords, debugging options, etc. For example, the debugger 800 may allow the user to specify this information in a file such as in the following example:

-H davinci -U hpan -P secrets -R client calc_client 264167
-H davinci -U hpan -P secrets -R client calc_client 545555
-H atlantic -U meier -P dontlook -R server calc_servera
-H thistle -U hpan -P hideit -R both calc_serverb This example file shows a distributed application made up of four programs running on three different machines under three different user ID's. The first line specifies a program named calc_client should be started on a machine named davinci under the user ID of hpan with password secrets. The program will play the role of a client and is passed one argument which is 264167. The second line starts a second instance of the client program calc_client on the same machine and user ID. In this case, the program argument is 545555. The third line specifies that a program named calc_servera should be started on a machine named atlantic under the user ID of meier with password dontlook. This program will play the role of a server. And finally, the fourth line specifies that a program named calc_serverb should be started on a machine named thistle under the user ID of hpan with password hideit. This program is both a client program and a server program.

The following procedure is executed once for each of the programs that make up the application. During initialization, the debugger 800 will call the Director component 815 passing the name of the file that specifies the various programs for the application. The director component 815 will open the above file and for each program specified will do the following:

1. Read in the name of the program, arguments, host machine etc.
2. Allocate and initialize a controller data structure.
3. Start a debugger back-end on the host machine that the program should run on using the remote execution command (rexec).
4. Allocate and initialize an address-space data structure.
5. Send a Establish Connection message request to the debugger back-end.
6. Send a Load A Program message request to the back-end to load the application program.
7. Send a Get Loader Information message request to the back-end to update the address-space data structure with information about what programs and library routines were loaded as a result of the Load A Program message request.
8. Send a Get Symbol Table message request to the back-end to update the address-space data structure with the symbol tables for the programs and library routines.
9. Call the Debug Engine to perform standard initialization routines (e.g., run the program to the first executable source line).

Running the Application Program

In response to one of the start execution commands from the user, the Interface component 840 will call the Director component 815 to supervise the execution of the parallel and distributed application. The Director component 815 starts the application by sending commands to each back-end (101, 102, and 103) to start or continue executing the programs they are monitoring.

In many client/server applications, it is necessary for the server programs to be running before the clients can be started. By specifying the roles of client, server, or both for the programs, the Director 815 may ensure that the client programs are not started until all of the programs that are servers or both are ready to receive client requests. In the general case, the user can add a call to a library routine named dbgServerReady at the point in the server program where it is ready to receive client messages. The C language syntax for this library routine is: dbgServerReady( );.

This dbgServerReady routine notifies the Director component 815 of the debugger 800 that the server is ready to receive client requests by, for example, sending a signal or executing a breakpoint. If the server is not running under the debugger 800, dbgServerReady will simply return. To improve ease of use, the communication middle-ware may automatically execute the call to dbgServerReady. For example, for RPC it may be executed at the beginning of the RPC "server listen" routine.

After the application is started, the Director 815 will poll the back-ends (101, 102, and 103) for current status until one of the back-ends reports that a program it is monitoring has encountered a breakpoint, watchpoint, program interrupt, or termination. The Director 815 will then send a Stop Execution message request to all other back-ends, which in turn will send an "interrupt program execution" signal (e.g., SIGINIT in UNIX™) to each of the programs they are monitoring.

The following are the steps preferred in carrying out the method of, and system for, the Director 815 when it is called by the Interface component 840 in response to a command from the user to start or continue the execution of a distributed application. These steps are sufficient to enable one of ordinary skill to write code in any suitable computer programming language.

1. Start or continue the execution of the application by looping thru all of the controllers and, for each one, doing the following:
    a. If the role of the program associated with the controller is client, check to see that all of the programs that have a role of server or both have executed the dbgServerReady library routine and are therefore ready to receive client requests. If not skip to the next controller.
    b. For all address-space structures pointed to by this controller execute the conventional debugger routine that will start the program executing.
2. Execute polling loop.
    a. Get the first controller from the list of controllers created at debugger initialization.
    b. Send a Check For Interrupt message request to the back-end. If an interrupt has occurred, exit the polling loop by going to step 3.
    c. If not at the end of the list of controllers, get the next controller and go to step 2.b.
    d. Call a user interface routine to determine if the user has executed a Stop command. If yes, exit the polling loop by going to step 3.
    e. Wait for one second to limit the contention of network resources (e.g. execute a sleep(1) UNIX™ system call).
    f. Go back to the beginning of the polling loop at step 2.a.
3. Stop the execution of the application by looping thru all of the controllers and sending a Stop Execution message request to any controller that has at least one thread still running.
4. Update the controller and address-space data structures by looping thru all of the controllers again and, for each one, doing the following:
    a. Get the first address-space ID running under the back-end by sending a Get Next Address Space ID message request with a address-space ID of 0.
    b. If no more address-space IDs are found, continue to next controller.
    c. Search the list of address-space data structures pointed to by the controller data structure to determine if this is a new address space (e.g., created by fork system call on UNIX™). If this is a new address-space:

Allocate and initialize an address-space data structure.
    Send a Get Loader Information message request to the back-end to update the address-space data structure with information about what programs and library routines were loaded.
    Send a Get Symbol Table message request to the back-end to update the new address-space data structure with the symbol tables for the programs and library routines.

d. Send a Get Address Space Information message request to the back-end and update the address-space data structure.

e. Send a Get Thread Information message request to the back-end for the current thread ID and update the address-space data structure.

f. If the information about that last program interrupt in the address-space indicates that a dynamic load has occurred do the following:

Send a Get Loader Information message request to the back-end to update the address-space data structure with information about what programs and library routines were loaded.

Send a Get Symbol Table message request to the back-end to update the new address-space data structure with the symbol tables for the programs and library routines.

g. If the information about that last program interrupt in the address-space indicates the program has executed a call to the dbgServerReady library routine, set a flag in the address-space data structure to indicate that this server is ready to receive client requests.

h. Check to see if there are any more address-spaces running under the back-end by sending a Get Next Address Space ID message request and go to step 4.b.

5. After all the controller and address-space data structures have been updated, return to the User Interface component which will display the current state of the application to the user and process commands.

The above describes a debugger client/server application comprising a front-end and one or more back-ends, including a Director component which handles most of the initialization and parallel execution control issues and a rp_client component and rp_server component which handles most of the distributed execution issues. The Director allows a Debug Engine to be unaware of most of the parallel and distributed aspects of the application. Thus, the Debug Engine can be created by re-using a serial debugger for presenting the state information about the various programs that make up the application.

More specifically, the above describes a system for debugging a distributed computer program comprising: a Front End means comprising: a Director means for allocating a controller data structure for storing an execution state of the distributed computer program; a Debug Engine means derived from a serial debugger supporting conventional serial debugging commands and having global variables for storing a state of a debug session; and means for accessing the controller data structure to update the global variables; and a Back End means for executing requests from the Front End means to control execution of the distributed computer program.

Also, the above describes a method of debugging a distributed computer program, comprising the steps of: allocating a controller data structure by a Front End for storing an execution state of the distributed computer program; storing a state of a debug session in global variables of a Debug Engine derived from a serial debugger supporting conventional serial debugging commands; accessing the controller data structure to update the global variables; and executing requests by a Back End from the Front End to control execution of the distributed computer program.

In addition, the above describes a computer program for debugging a distributed computer program, comprising: a Front End program means comprising: a Director program means for allocating a controller data structure for storing an execution state of the distributed computer program; a Debug Engine program means derived from a serial debugger supporting conventional serial debugging commands and having global variables for storing a state of a debug session; and program means for accessing the controller data structure to update the global variables; and a Back End program means for executing requests from the Front End program means to control execution of the distributed computer program.

All of the above described data structures, definitions, routines, and interfaces bear the following copyright notice: Copyright IBM Corporation 1995

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

We claim:

1. A method for debugging an application program in a network of processing systems, the method comprising:

calling a library routine, by the application program, to verify whether a debugger back-end is attached to a process running the application program, and if not, performing the following steps:

(i) invoking a routine, by the application program, to obtain a communication endpoint address of a debugger through a tool locator;

(ii) establishing a connection to the debugger using the communication endpoint address; and (iii) sending the debugger, using the established connection, a debugging request to attach a back-end of the debugger to the process running the application program.

2. A method, in a network of processing systems, for debugging an application program, the method comprising:

enabling an application program, running on a first machine within the network of processing systems, to locate, at run time, a distributed debugger front-end running on a different machine;

sending, from the application to the located debugger front-end, a message requesting debugging services; and attaching a back-end of the distributed debugger to a process for which debugging services is requested wherein the message specifies information to obtain authorization for the debugger to attach a back-end of the debugger to the debuggee.

3. A system, in a network of processing systems, for debugging an application program, the system comprising:

means for enabling an application program, running on a first machine within the network of processing systems, to locate, at run time, a distributed debugger front-end running on a different machine;

means for sending, from the application to the located debugger front-end, a message requesting debugging services; and means for attaching a back-end of the distributed debugger to a process for which debugging services is requested wherein the message specifies information to obtain authorization for the debugger to attach a back-end of the debugger to the debuggee.

4. A method for debugging at least one DBMS external program in a network of processing systems, the method comprising:

initiating an execution, by a client program running on a first machine in the network, of the at least one DBMS external program;

loading, by a DBMS running on a second machine, each of the at least one external program in a separate process;

prior to executing the at least one external program, calling a library routine, by the DBMS, to verify whether a debugger back-end is attached to the separate process, and if not, performing the following steps:

(i) invoking a routine, by the DBMS, to obtain a communication endpoint address of a debugger through a tool locator;

(ii) establishing a connection to the debugger using the communication endpoint address;

(iii) sending the debugger, using the established connection, a debugging request to attach a back-end of the debugger to at least one of each of the separate process running each of the at least one DBMS external program; and running the at least one separate process, under the control of the debugger, to an executable statement of the DBMS external program, and executing a breakpoint to allow the DBMS external program to be debugged by using debugging commands of the debugger.

5. A method for debugging at least one transaction program in a network of processing systems, the method comprising:

invoking the at least one transaction program, by a client program running on a first machine in the network;

allocating, by a transaction monitor running on a second machine, a separate process to load each of the at least one transaction program;

prior to executing the transaction program, calling a library routine, by the transaction monitor, to verify whether a debugger back-end is attached to the separate process, and if not, performing the following steps:

(i) invoking a routine, by the transaction monitor, to obtain a communication endpoint address of a debugger through a tool locator;

(ii) establishing a connection to the debugger using the communication endpoint address;

(iii) sending the debugger, using the established connection, a debugging request to attach a back-end of the debugger to the separate process running the transaction program; and running the at least one separate process, under the control of the debugger, to an executable statement of the transaction program, and executing a breakpoint to allow the transaction program to be debugged by using debugging commands of the debugger.

6. A method for debugging a message queuing program in a network of processing systems, the method comprising:

queuing a message, by a client program running on a first machine in the network, to a queue on a second machine;

allocating, by a message queuing system running on a second machine, a separate process to load a message server program;

prior to executing the message server program, calling a library routine, by the message queuing system, to verify whether a debugger back-end is attached to the separate process, and if not, performing the following steps:

(i) invoking a routine, by the message queuing system, to obtain a communication endpoint address of a debugger through a tool locator;

(ii) establishing a connection to the debugger using the communication endpoint address;

(iii) sending the debugger, using the established connection, a debugging request to attach a back-end of the debugger to the separate process running the message server program; and running the separate process, under the control of the debugger, to an executable statement of the message server program, and executing a breakpoint to allow the message server program to be debugged by using debugging commands of the debugger.

7. A method for debugging an object method of a distributed object in a network of processing systems, the method comprising:

invoking the object method of the distributed object, by a client program running on a first machine in the network;

allocating, by a distributed object system running on a second machine, a separate process to load a program that contains the object method of the distributed object;

prior to executing the object method of the distributed object, calling a library routine, by the distributed object system, to verify whether a debugger back-end is attached to the separate process, and if not, performing the following steps:

(i) invoking a routine, by the distributed object system, to obtain a communication endpoint address of a debugger through a tool locator;

(ii) establishing a connection to the debugger using the communication endpoint address;

(iii) sending the debugger, using the established connection, a debugging request to attach a back-end of the debugger to the separate process running the object method of the distributed object; and running the object method of the distributed object, under the control of the debugger, to an executable statement of the object method of the distributed object, and executing a breakpoint to allow the object method of the distributed object to be debugged by using debugging commands of the debugger.

8. A method for locating application development tools (tools) within a network of processing systems, the method comprising:

receiving, from a tool, a registration of the tool, when the tool is started on any machine within the network, indicating certain properties of the tool;

maintaining a list of tools and corresponding properties for which the registration of the tools has been received;

receiving, from an application program, a boolean expression of search criteria specifying desired properties for a desired tool;

returning, to the application program, at least one located tool meeting the search criteria and a communication endpoint address that can be used to establish a dynamic connection with the located tool; and maintaining a cursor position, in the list of tools, at the tool meeting the search criteria returned; and finding a next tool, upon receipt of a request to find the next tool, meeting the search criteria if more than one tool meets the search criteria.

9. The method of claim 8 further comprising means for maintaining an association between the cursor position and the application program from which the search criteria is received whereby search criteria from more than one application program can be received in a current session.

10. A method for invoking a debugger in a network of processing systems, the method comprising:

sending, to a tool locator, from a debugger client running on a first machine in the network, a boolean expression of search a criteria specifying desired properties of a desired debugger;

receiving, from the tool locator, a located debugger meeting the search criteria of the desired debugger and a communication endpoint address that can be used to establish a connection with the located debugger;

sending to the located debugger, from the debugger client, a message requesting debugging services for a debugee wherein the message specifies information to obtain authorization for the debugger to attach a back-end of the debugger to the debugee.

11. The method of claim 10 wherein the step of receiving the located debugger meeting search the criteria of the desired debugger comprises receiving a list of debuggers meeting the search criteria.

12. The method of claim 10 wherein the debugger client is a software system and the debugee is a user's program.

13. The method of claim 10 wherein the debugger client is an application program different from the debugee.

14. The method of claim 10 wherein the debugger client and the debugee is a same user's program.

15. The method of claim 10 wherein the message requesting debugging services specifies information for the debugger to locate the debugee.

16. The method of claim 10 wherein the information includes network ID of the debugee machine, address-space ID, and a thread ID.

17. The method of claim 10 wherein the information includes login ID and password.

18. The method of claim 10 wherein the message specifies an entry point in the debugee where the debugging session should begin.

19. A computer program product comprising:

a computer usable medium having computer programming code embodied therein comprising:

a first set of routines to be called by a tool located within a network of processing systems comprising:

a first routine for adding an address of the tool to a registry;

a second routine for deleting the address from the registry;

a third routine for indicating that the tool is still available to provide services; and a second set of routines to be called by a client requesting tool services comprising:

a fourth routine for beginning a search of the registry to locate a desired tool;

a fifth routine for retrieving the address of a next tool that matches a given specification; and a sixth routine for ending a search of the registry.

20. A computer program product comprising:

a computer usable medium having computer programming code embodied therein comprising:

means for receiving a first set of messages from a tool located within a network of processing systems comprising:

a first message for adding an address of the tool to a registry;

a second message for deleting the address from the registry;

a third message for indicating that the tool is still available to provide services; and means for receiving a second set of messages to be called by a client requesting tool services comprising:

a fourth message for beginning a search of the registry to locate a desired tool;

a fifth message for retrieving the address of a next tool that matches a given specification;

a sixth message for ending a search of the registry; and a seventh message for requesting services of the tool.

21. A computer program product comprising:

a computer usable medium having computer programming code embodied therein comprising:

means for receiving, from an application development tool, a registration of the tool, when the tool is started on any machine within a network of machines, indicating certain properties of the tool;

means for maintaining a list of tools and corresponding properties for which the registration of the tools has been received;

means for receiving, from an application program, a boolean expression of search criteria specifying desired properties for a desired tool to be used in conjunction with the application program;

means for returning, to the application program, at least one located tool meeting the search criteria and a communication endpoint address that can be used to establish a connection with the located tool; and means for maintaining a cursor position, in the list of tools, at the tool meeting the search criteria returned; and means for finding a next tool, upon receipt of a request to find the next tool, meeting the search criteria if more than one tool meets the search criteria.

22. The computer program product of claim 21 wherein the means for maintaining a list of tools further comprises means for creating a structure having a first pointer to a next registry item; a second pointer to a previous registry item; the properties of the tool, the address of the tool; a frequency in seconds that the tool will send still available messages; and a time indicating either an entry for the tool was initialized or a last time the still available message was received.

23. The computer program product of claim 21, wherein the computer usable medium having computer programming code embodied therein further comprises means for maintaining an association between the cursor position and the application program from which the search criteria is received whereby search criteria from more than one application program can be received in a current session.

24. A tool locator mechanism for locating application development tools running within a network of processing systems, the tool locator mechanism comprising:

means for receiving, from a tool, a registration of the tool, when the tool is started on any machine within the network, indicating certain properties of the tool;

means for maintaining a list of tools and corresponding properties for which the registration of the tools has been received;

means for receiving, from an application program, a boolean expression of search criteria specifying desired properties for a desired tool;

means for returning, to the application program, at least one located tool meeting the search criteria and a communication endpoint address that can be used to establish a connection with the located tool; and means for maintaining a cursor position, in the list of tools, at the tool meeting the search criteria returned; and means for finding a next tool, upon receipt of a request to find the next tool, meeting the search criteria if more than one tool meets the search criteria.

25. The tool locator mechanism of claim 24 further comprising means for maintaining an association between the cursor position and the application program from which the search criteria is received whereby search criteria from more than one application program can be received in a current session.

26. A system for debugging a debugee residing on a first machine in a network of processing systems wherein a debugger may reside on a second machine in the network of processing systems, the system comprising:

means for sending, by a debugger client, to a tool locator, a boolean expression of search criteria specifying desired properties of a desired debugger;

means for receiving, from the tool locator, a communication endpoint address that can be used to establish a connection to the debugger meeting the search criteria of the desired debugger;

means for sending, by the debugger client, using the received communication endpoint address, a debugging request message for the debugger to debug the debugee;

means for having the debugee debugged by the debugger; and wherein the message specifies information to obtain authorization for the debugger to attach a back-end of the debugger to the debuggee.

27. The system of claim 26 wherein the debugger client is the debugee.

28. The system of claim 26 wherein the debugger client is an application program different from the debugee.

29. The system of claim 26 wherein the debugger client is a software system and the debugee is a user's program.

30. The system of claim 26 wherein the debugging request message contains an address of the first machine where the debugee is running; an user id, a password of the user id, an address space id, and a thread id that the debugee is running under; and an instruction address where a debugging session should begin.

* * * * *

UNITED STATES PATENT AND TRADEMARK OFFICE
CERTIFICATE OF CORRECTION

PATENT NO.   : 6,058,393  
DATED        : May 2, 2000  
INVENTOR(S)  : Meier et al.

Page 1 of 1

It is certified that error appears in the above-identified patent and that said Letters Patent is hereby corrected as shown below:

<u>Title page,</u>  
ABSTRACT, line 3, insert -- ( -- before "including"

<u>Column 2,</u>  
Line 31, "TUXEDO,™" should read -- TUXEDO™, --

<u>Column 17,</u>  
Line 49, "debugit" should read -- debugIt --

<u>Column 19,</u>  
Lines 11 and 47, "debugit" should read -- debugIt --

<u>Column 22,</u>  
Line 1, "debugit" should read -- debugIt --

Signed and Sealed this

Fifth Day of March, 2002

JAMES E. ROGAN  
*Director of the United States Patent and Trademark Office*

*Attest:*

*Attesting Officer*